(12) United States Patent
Yonezaki et al.

(10) Patent No.: US 10,377,927 B2
(45) Date of Patent: Aug. 13, 2019

(54) SURFACE PROTECTION SHEET

(71) Applicants: NITTO DENKO CORPORATION, Ibaraki-shi, Osaka (JP); NITTO BELGIUM NV, Genk (BE)

(72) Inventors: Kousuke Yonezaki, Ibaraki (JP); Yutaka Tosaki, Ibaraki (JP); Minoru Hanaoka, Ibaraki (JP); Bart Forier, Genk (BE); Greet Bossaert, Genk (BE); Donald Pinxten, Genk (BE); Michael Pellens, Genk (BE)

(73) Assignees: NITTO DENKO CORPORATION, Ibaraki-shi, Osaka (JP); NITTO BELGIUM NV, Genk (BE)

( * ) Notice: Subject to any disclaimer, the term of this patent is extended or adjusted under 35 U.S.C. 154(b) by 0 days.

(21) Appl. No.: 15/472,413

(22) Filed: Mar. 29, 2017

(65) Prior Publication Data

US 2017/0283661 A1 Oct. 5, 2017

(30) Foreign Application Priority Data

Mar. 31, 2016 (JP) .................. 2016-071924
Dec. 26, 2016 (JP) .................. 2016-251587

(51) Int. Cl.
| | | |
|---|---|---|
| *C09J 7/02* | (2006.01) | |
| *C09J 133/08* | (2006.01) | |
| *C08F 220/18* | (2006.01) | |
| *C09J 7/38* | (2018.01) | |
| *C09J 7/22* | (2018.01) | |
| *C09J 7/24* | (2018.01) | |

(52) U.S. Cl.
CPC ........... *C09J 133/08* (2013.01); *C08F 220/18* (2013.01); *C09J 7/22* (2018.01); *C09J 7/243* (2018.01); *C09J 7/38* (2018.01); *C09J 7/385* (2018.01); *C08F 2220/1808* (2013.01); *C09J 2433/00* (2013.01)

(58) Field of Classification Search
None
See application file for complete search history.

(56) References Cited

U.S. PATENT DOCUMENTS

| | | | | |
|---|---|---|---|---|
| 4,925,908 | A * | 5/1990 | Bernard ................ | C08F 220/12 526/320 |
| 9,695,337 | B2 * | 7/2017 | Kishioka ................ | C09J 133/08 |
| 2005/0253277 | A1 * | 11/2005 | Yamanaka ................ | B32B 7/06 257/778 |
| 2011/0046296 | A1 * | 2/2011 | Morino ................ | C09J 133/08 524/555 |
| 2011/0111660 | A1 * | 5/2011 | Morino ................ | C09J 133/08 442/149 |
| 2016/0280967 | A1 * | 9/2016 | Ukei ................ | C09J 133/06 |

FOREIGN PATENT DOCUMENTS

| | | | |
|---|---|---|---|
| EP | 1 775 041 A1 | 4/2007 | |
| EP | 3 064 559 A1 | 9/2016 | |
| JP | 8-134415 A | 5/1996 | |
| JP | 2012-077226 A | 4/2012 | |
| JP | WO 2015064283 A1 * | 5/2015 | ............ C09J 133/06 |
| WO | 2015/064283 A1 | 5/2015 | |
| WO | 2015/097847 A1 | 7/2015 | |

OTHER PUBLICATIONS

Inagaki, Timoyuki et al., "Surface Protection Adhesive Sheet or Tape for Punching and Drawing", machine translation of WO2015097847A1, published Jul. 2, 2015.*

Extended European Search Report dated Aug. 28, 2017, from European Patent Office in counterpart application No. 17000509.4.

* cited by examiner

*Primary Examiner* — Anish P Desai
(74) *Attorney, Agent, or Firm* — Sughrue Mion, PLLC (57) ABSTRACT

Provided is a surface protection sheet that is less susceptible to breaking and tearing caused by adherend processing and can be easily removed from the adherend. The surface protection sheet comprises a substrate and a PSA layer placed on one face of the substrate. The base polymer of the PSA layer has a glass transition temperature of −50° C. or higher. The surface protection sheet has at least 200% elongation at break in both the machine direction and the transverse direction.

12 Claims, 1 Drawing Sheet

SURFACE PROTECTION SHEET

CROSS-REFERENCE

The present application claims priority to Japanese Patent Application No. 2016-71924 filed on Mar. 31, 2016 and Japanese Patent Application No. 2016-251587 filed on Dec. 26, 2016; and the entire contents thereof are incorporated herein by reference.

BACKGROUND OF THE INVENTION

1. Field of the Invention

The present invention relates to a surface protection sheet.

2. Description of the Related Art

In general, pressure-sensitive adhesive (or PSA; the same applies hereinafter) has characteristics of being in a soft solid (viscoelastic) state in a room temperature range and easily adhering to adherend under some pressure. With the benefit of such properties, PSA is widely used for various purposes in a form of a substrate-supported single-faced PSA sheet having a PSA layer on one face of the substrate. For instance, the substrate-supported single-faced PSA sheet is applied to a metal plate and preferably used as a surface protection sheet to protect the surface of the metal plate during metalworking processes such as drawing, bending and punching. Technical literature related to surface protection sheets used in metalworking includes Japanese Patent Application Publication No. H8-134415 and Japanese Patent Application Publication No. 2012-77226.

SUMMARY OF THE INVENTION

After serving protection purposes, surface protection sheets are removed from adherends when appropriate. Thus, a surface protection sheet for metalworking is required to have properties that allow its easy removal from the processed metal plate (workpiece). For instance, a desirable surface protection sheet can maintain its light peelability even with aging after applied to an adherend. This type of surface protection sheet is desirably unsusceptible to breaking and tearing in metalworking (in particular, a process involving deformation of the metal plate). This is because breaking and tearing of a surface protection sheet can leave a torn piece of the surface protection sheet on the metalworking machine or on other workpieces, thereby causing a machine defect or a decrease in yield of the process. Breaking and tearing of the surface protection sheet can also decrease the efficiency of peeling and removing the surface protection sheet from the metal plate.

An objective of this invention is thus to provide a surface protection sheet that is less susceptible to breaking and tearing caused by processing of the adherend (the object being protected) and can be easily removed from the adherend.

Solution to Problem

The surface protection sheet disclosed herein comprises a substrate and a PSA layer placed on one face (first face) of the substrate. The base polymer of the PSA layer has a glass transition temperature (Tg) of −50° C. or higher. The surface protection sheet has at least 200% elongation at break ($Eb_{MD}$ and $Eb_{TD}$) in both the machine direction (MD) and the transverse direction (TD). With the surface protection sheet highly stretchable in both MD and TD, the stress possibly applied in adherend processing can be absorbed or dispersed by extensional deformation of the surface protection sheet. This can reduce damage (breaking, tearing, ripping, etc.) to the surface protection sheet. With the base polymer having a Tg of at least the prescribed value, the PSA exhibits good cohesion. This retards the progress of wetting of the adherend surface with the PSA surface (adhesive face), inhibiting the increase in peel strength with aging. These effects are combined to bring about a surface protection sheet that is less susceptible to damage caused by adherend processing and can be easily removed from the adherend. Such surface protection sheet is excellent in removal work efficiency.

The surface protection sheet preferably has tensile strength at break ($TS_{MD}$ and $TS_{TD}$) of 15 N/20 mm or greater in both the machine direction (MD) and the transverse direction (TD). With the surface protection sheet with tensile strength at break equal to or greater than the prescribed value in both MD and TD, breaking, tearing and ripping of the surface protection sheet can be favorably inhibited.

The PSA layer preferably has a toluene-insoluble fractions with a weight fraction (gel fraction) $G_C$ of 60% or higher. With gel fraction $G_C$ at or above the prescribed value, leftover adhesive residue on the adherend tends to be reduced. The PSA layer preferably has toluene-soluble fractions having a weight average molecular weight (sol molecular weight) $S_{M_W}$ of $10 \times 10^4$ or higher. When sol fractions with higher mobility than the gel have at least the prescribed weight average molecular weight (Mw), the progress of wetting of the adherend surface with the adhesive face is retarded, whereby the increase in peel strength with aging can be effectively inhibited.

In a preferable embodiment, by nanoindentation, the PSA layer shows an unloading curve having a minimum load $L_{min}$ of less than −2.0 μN. With such a PSA layer, wetting of the adherend surface is less likely to progress. This can favorably inhibit the increase in peel strength with aging.

The base polymer is preferably a polymer of a starting monomer mixture comprising a monomer whose homopolymer has a Tg of 10° C. or higher (or a monomer H hereinafter) in an amount of 20% by weight or more of the total monomer content. The monomer H used in such a proportion tends to increase the cohesion of the PSA and retard the progress of wetting of the adherend surface with the adhesive face. This can favorably inhibit the increase in peel strength with aging.

The surface protection sheet disclosed herein can be preferably made in an embodiment where the PSA layer is an acrylic PSA layer. As the base polymer of the acrylic PSA layer, for instance, an acrylic polymer obtained by emulsion polymerization can be preferably used.

The surface protection sheet according to a preferable embodiment, the substrate has a thickness of 100 μm or smaller. According to the art disclosed herein, even in an embodiment using a substrate having a thickness of 100 μm or smaller, the surface protection sheet can be made to be less susceptible to damage caused by adherend processing.

A preferable substrate of the surface protection sheet disclosed herein comprises polyolefin-based resin film. In such an embodiment, the surface protection sheet can be favorably made to be less susceptible to damage caused by adherend processing and to provide excellent removal work efficiency from the adherend.

The surface protection sheet according to a preferable embodiment has an aged peel strength $P_A$ of 0.70 N/20 mm or less. The aged peel strength $P_A$ is determined at a peeling rate of 3 m/min after applied to a stainless steel (SUS) plate and stored at 60° C. for seven days. The surface protection sheet with peel strength as low as or lower than the prescribed value under the given conditions provides excellent removal work efficiency from the adherend even after aged.

In the surface protection sheet according to a preferable embodiment, the aged peel strength $P_A$ (in N/20 mm) is up to 2.0 times the initial peel strength $P_0$ (in N/20 mm) determined at a peeling rate of 3 m/min at 15 minutes after applied to a SUS plate. That is, $P_A/P_0$ is 2.0 or lower. The surface protection sheet with such a small increase in peel strength when aged provides easy application to an adherend and great protection of the adherend as well as easy removal from the adherend.

Even when used on an adherend that is subjected to deformation accompanying high stress (e.g. a metal plate subjected to drawing), damage such as breaking, tearing and ripping caused by the stress is less likely to occur and easy removal from the processed adherend is possible. Accordingly, the surface protection sheet disclosed herein is particularly preferably used on a metal plate to be subjected to drawing.

DETAILED DESCRIPTION OF THE INVENTION

Preferred embodiments of the present invention are described below. Matters necessary to practice this invention other than those specifically referred to in this description can be understood by a person skilled in the art based on the disclosure about implementing the invention in this description and common general knowledge at the time of application. The present invention can be practiced based on the contents disclosed in this description and common technical knowledge in the subject field.

<Surface Protection Sheet>

Figure 1:
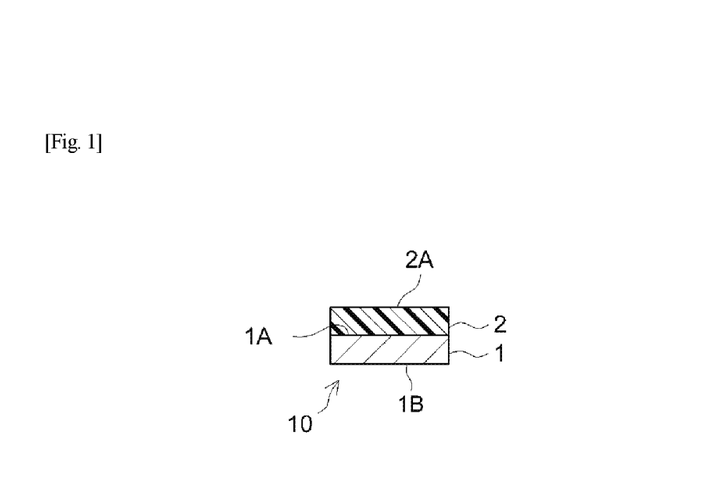
FIG. 1 shows a cross-sectional diagram schematically illustrating an embodiment of the surface protection sheet.

The surface protection sheet disclosed herein has a PSA layer on a substrate sheet (support substrate). FIG. 1 shows a cross-sectional structure of the surface protection sheet according to an embodiment. Surface protection sheet 10 comprises a PSA layer 2 provided on the first face 1A of a substrate 1. When used, it is adhered to an object to be protected over the surface 2A of PSA layer 2. Prior to use (i.e. before adhered to the object to be protected), surface protection sheet 10 can be in a form where the surface 2A (adhesive face, i.e. the bonding surface to the adherend) of PSA layer 2 is protected with a release liner (not shown in the drawing) having a release face at least on the PSA layer side. Alternatively, surface protection sheet 10 may be in a form where, with the second surface (back face) 1B of substrate 1 being a release face, surface protection sheet 10 is wound in a roll so that the other face comes in contact with the PSA layer 2 to protect the surface (adhesive face) 2A.

As the release liner, commonly-used release paper and the like can be used without particular limitations. For instance, a release liner having a release layer on a surface of a liner substrate such as plastic film and paper, a release liner formed from a low-adhesive material such as fluorinated polymer (polytetrafluoroethylene, etc.) and polyolefinic resin, and the like can be used. The release layer can be formed by subjecting the liner substrate to surface treatment with various release agents including silicone-based, long-chain alkyl-based, and fluorinated kinds as well as molybdenum sulfide.

The thickness of the surface protection sheet disclosed herein is not particularly limited. From the standpoint of the handling properties, the lightness of weight, etc., it is usually suitably about 1000 μm or less (typically about 300 μm or less, e.g. about 150 μm or less). In an embodiment, the thickness of the surface protection sheet is preferably 110 μm or less, more preferably 90 μm or less, yet more preferably 70 μm or less, or possibly, for instance, 60 μm or less. The thickness of the surface protection sheet can be typically greater than 20 μm, preferably greater than 30 μm, or more preferably greater than 40 μm, for instance, greater than 45 μm.

As used herein, the thickness of the surface protection sheet refers to the thickness from the PSA layer surface (adhesive face) through the back face (opposite from the adhesive face), but it excludes the thickness of the release liner.

The thickness of the substrate constituting the surface protection sheet disclosed herein is not particularly limited. The substrate's thickness can be, for instance, about 800 μm or less (typically about 250 μm or less). In an embodiment, the thickness of the substrate (typically, non-foamed resin film) is preferably 100 μm or less, more preferably 80 μm or less, or yet more preferably 65 μm or less, for instance, 55 μm or less. With decreasing thickness of the substrate, the surface protection sheet tends to exhibit greater conformability to the adherend shape during processing (e.g. a process including several sequential pressing steps) or after processing, and its lifting and peeling tend to be inhibited. From the standpoint of the handling properties, etc., the substrate's thickness can be typically 15 μm or greater, preferably 20 μm or greater, more preferably 30 μm or greater, or yet more preferably 40 μm or greater, or possibly, for instance, 45 μm or greater.

No particular limitations are imposed on the thickness of the PSA layer constituting the surface protection sheet disclosed herein. From the standpoint of preventing leftover adhesive residue on the adherend, the PSA layer's thickness is usually suitably 15 μm or less, preferably 10 μm or less, or more preferably 7 μm or less (e.g. 6 μm or less). The PSA layer's thickness is usually suitably 1 μm or greater, or preferably 2 μm or greater. From the standpoint of inhibiting lifting and peeling during or after processing, the PSA layer's thickness is preferably 3 μm or greater, or more preferably 4 μm or greater.

(Elongation at Break (Eb))

In the surface protection sheet disclosed herein, both the MD elongation at break ($Eb_{MD}$) and the TD elongation at break ($Eb_{TD}$) are 200% or greater. With the surface protection sheet thus highly stretchable in both MD and TD, the stress possibly applied to the surface protection sheet in adherend processing can be absorbed or dispersed by extensional deformation of the surface protection sheet. This can reduce damage (breaking, tearing, ripping, etc.) to the surface protection sheet.

The elongation at break (%) is measured by the method described below.

The surface protection sheet subject to measurement is cut to the type 2 shape (rectangular, 20 mm wide) according to JIS K 7127 to prepare a test piece. The test piece is subjected to a tensile test until the test piece breaks at a line spacing of 50 mm, at a chuck distance of 100 mm, and at a tensile speed of 300 mm/min. From the initial line spacing $L_0$ (50 mm here) and the line spacing $L_1$ at break of the test piece, the elongation at break is determined by the next equation: elongation at break (%)=100×$(L_1-L_0)$/$L_0$. As the tensile tester, product name AUTOGRAPH AG-10G tensile tester available from Shimadzu Corporation can be used. The same method is used in the working examples described later.

When measuring the MD elongation at break $Eb_{MD}$, the test piece is prepared so that its length direction is in the MD of the surface protection sheet. When measuring the TD elongation at break $Eb_{TD}$, the test piece is prepared so that its length direction is in the TD of the surface protection sheet.

The MD of the surface protection sheet typically corresponds to the length direction of the substrate constituting the surface protection sheet (the winding direction in a rolled surface protection sheet). The TD of the surface protection sheet is the direction perpendicular to the MD of the surface protection sheet.

In the surface protection sheet according to a preferable embodiment, at least one (preferably each) of $Eb_{MD}$ and $Eb_{TD}$ is 300% or greater, more preferably 350% or greater, yet more preferably 400% or greater, or particularly preferably 500% or greater, for instance, 600% or greater. With an increase in at least one (preferably each) of $Eb_{MD}$ and $Eb_{TD}$, damage to the surface protection sheet can be better prevented during adherend processing. The upper limits of $Eb_{MD}$ and $Eb_{TD}$ are not particularly limited. From the standpoint of the ease of production, handling properties, etc., one or each of $Eb_{MD}$ and $Eb_{TD}$ is usually suitably about 1500% or less, or even about 1200% or less (e.g. about 1000% or less). The elongation at break of the surface protection sheet can be adjusted by the selection of the species of substrate material and the production method (molding method, molding conditions), etc.

The $Eb_{TD}$ to $Eb_{MD}$ ratio ($Eb_{TD}$/$Eb_{MD}$ ratio) is not particularly limited. From the standpoint of the usability, the less anisotropic the properties of the surface protection sheet are, the more advantageous it is. From such a standpoint, the $Eb_{TD}$/$Eb_{MD}$ ratio value of the surface protection sheet is usually suitably 5.0 or lower, preferably 3.0 or lower, more preferably 2.0 or lower, or yet more preferably 1.7 or lower (e.g. 1.5 or lower). For a similar reason, the $Eb_{TD}$/$Eb_{MD}$ ratio value of the surface protection sheet is suitably 0.2 or higher, preferably 0.3 or higher, more preferably 0.5 or higher, or yet more preferably 0.6 or higher (e.g. 0.7 or higher). In a preferable embodiment, the $Eb_{TD}$/$Eb_{MD}$ ratio value can be about 1.0 (e.g. 0.9 or higher and 1.1 or lower). The $Eb_{TD}$/$Eb_{MD}$ ratio value can be adjusted, for instance, by the selection of the substrate material species, the production method (molding method and molding conditions), etc.

(Tensile Strength at Break (TS))

In the surface protection sheet disclosed herein, it is preferable that at least one of the MD tensile strength at break $TS_{MD}$ and the TD tensile strength at break $TS_{TD}$ is greater than 15 N/20 mm; and it is more preferable that each of the MD tensile strength at break $TS_{MD}$ and the TD tensile strength at break $TS_{TD}$ is greater than 15 N/20 mm. According to the surface protection sheet with such tensile strength at break, damage to the surface protection sheet can be favorably inhibited. The surface protection sheet disclosed herein can be favorably made in an embodiment where at least one (preferably each) of $TS_{MD}$ and $TS_{TD}$ is 17 N/20 mm or greater (more preferably 19 N/20 mm or greater, e.g. 20 N/20 mm or greater). The upper limits of $TS_{MD}$ and $TS_{TD}$ are not particularly limited. They are usually suitably 50 N/20 mm or less (e.g. 40 N/20 mm or less). From the standpoint of suitably obtaining high elongation at break simultaneously, they can be 35 N/20 mm or less (e.g. 30 N/20 mm or less). The tensile strength at break of the surface protection sheet can be adjusted, for instance, by the selection of the species of substrate material, the production method (molding method, molding conditions), etc.

The tensile strength (N/20 mm) at break can be determined in the measurement of elongation at break, as the strength of the test piece when it breaks. The same method is used in the working examples described later.

The $TS_{TD}$ to $TS_{MD}$ ratio ($TS_{TD}$/$TS_{MD}$ ratio) is not particularly limited. From the standpoint of the usability, the less anisotropic the properties of the surface protection sheet are, the more advantageous it is. From such a standpoint, the $TS_{TD}$/$TS_{MD}$ ratio value of the surface protection sheet is usually suitably 3.0 or lower, preferably 2.0 or lower, more preferably 1.8 or lower, or yet more preferably 1.5 or lower. For a similar reason, the $TS_{TD}$/$TS_{MD}$ ratio value of the surface protection sheet is suitably 0.3 or higher, preferably 0.5 or higher, more preferably 0.6 or higher, or yet more preferably 0.7 or higher. In a preferable embodiment, the $TS_{TD}$/$TS_{MD}$ ratio value can be about 1.0 (e.g. 0.9 or higher and 1.1 or lower). The $TS_{TD}$/$TS_{MD}$ ratio value can be adjusted, for instance, by the selection of the substrate material species, the production method (molding method, molding conditions), etc.

<Substrate>

As the substrate of the surface protection sheet disclosed herein, resin film, a rubber sheet, a foam sheet, a composite of these, etc., can be used. Examples of the rubber sheet include natural rubber sheets and butyl rubber sheets. Examples of the foam sheet include polyurethane foam sheets, and polychloroprene rubber foam sheets.

The art disclosed herein can be preferably applied to a surface protection sheet comprising a resin film substrate. The concept of "resin film" here refers to film typically obtained by molding a thin layer from a resin composition primarily comprising resin components as described below; it should be distinguished from so-called non-woven and woven fabrics. In other words, the concept of resin film excludes non-woven and woven fabrics. Preferable resin film is essentially not foamed. In other words, non-foamed resin film can be preferably used. Here, the non-foamed resin film refers to resin film that has not been deliberately subjected to a foaming process. In particular, the resin film may have an expansion ratio lower than about 1.1 (e.g. lower than 1.05, typically lower than 1.01).

Examples of the resin components forming the resin film include polyolefinic resins (polyethylene, polypropylene, ethylene-propylene copolymer, ethylene-vinyl acetate copolymer, etc.), vinyl chloride resins (typically soft vinyl chloride resin); vinyl acetate resin, polyurethane-based resins (ether-based polyurethane, ester-based polyurethane, carbonate-based polyurethane, etc.), urethane (meth)acrylate, thermoplastic elastomers (olefinic elastomer, styrene-based elastomer, acrylic elastomer, etc.), polyester-based resins (polyethylene terephthalate, polybutylene terephthalate, polyethylene naphthalate, polybutylene naphthalate, etc.), polycarbonate resin, polyamide resin, and polyimide resin. Among these resins, solely one species or a combination of two or more species can be used.

While no particular limitations are imposed, in the surface protection sheet according to an embodiment, it is preferable to use a substrate comprising, as its primary component(s), one, two or more species of resin selected from the group consisting of a polyolefinic resin, a vinyl chloride resin, a polyurethane-based resin, and a thermoplastic elastomer (typically a substrate comprising such resin(s) in an amount exceeding 50% by weight). For instance, a preferable substrate comprises one of these resins in an amount exceeding 50% by weight. Among the resin materials, in view of the heat stability, the lightness of weight, etc., polyolefinic resins, polyurethane-based resins and olefinic elastomers are preferable; in view of the handling properties, etc., polyolefinic resins and olefinic elastomers are particularly preferable.

The surface protection sheet disclosed herein can be preferably made in an embodiment comprising a substrate that comprises a polyolefinic resin as the primary component, that is, in an embodiment using a polyolefinic resin film substrate. For instance, it is preferable to use a polyolefinic resin film in which polyethylene (PE) resin or polypropylene (PP) resin accounts for 50% by weight or more of the entire substrate. In other words, in the polyolefinic resin film, the combined amount of PE resin and PP resin may account for 50% by weight or more of the entire substrate.

The PP resin may comprise, as the primary component, various polymer species (propylene-based polymers) that comprise propylene as a monomer unit. The PP resin may be essentially formed of one, two or more species of propylene-based polymer. The concept of propylene-based polymer here includes homopolypropylene as well as a random copolymer of propylene and other monomer(s) (random polypropylene) and a block copolymer (block polypropylene). The concept of propylene-based polymer here includes, for instance, the following species:

Propylene homopolymer (homopolypropylene), for instance, isotactic polypropylene;

Random copolymer (random polypropylene) of propylene and other α-olefin(s) (typically, one, two or more species selected from ethylene and α-olefins having 4 to 10 carbon atoms), preferably random polypropylene comprising propylene as the primary monomer (i.e. the monomer accounting for 50% by weight or more of the total monomer content);

Block copolymer (block polypropylene) of propylene and other α-olefin(s) (typically, one, two or more species selected from ethylene and α-olefins having 4 to 10 carbon atoms), preferably block polypropylene comprising propylene as the primary monomer (i.e. the monomer accounting for 50% by weight or more of the total monomer content).

The PE resin can be various types of polymer (ethylene-based polymer) comprising ethylene as a monomer. The PE resin may be essentially formed of one, two or more species of ethylene-based polymer. The ethylene-based polymer can be an ethylene homopolymer or a copolymer (random copolymer, block copolymer, etc.) of ethylene as the primary monomer and other α-olefin(s) as secondary monomer(s). Favorable examples of the α-olefins include α-olefins having 3 to 10 carbon atoms such as propylene, 1-butene (which can be a branched 1-butene), 1-hexene, 4-methyl-1-pentene and 1-octene. For instance, a preferable PE resin comprises, as the primary component, an ethylene-based polymer in which an α-olefin as the secondary monomer is copolymerized up to 10% by weight (typically up to 5% by weight).

The PE resin may comprise a copolymer of ethylene and a monomer (functional monomer) containing other functional group(s) in addition to a polymerizable functional group, copolymer of such a functional monomer and an ethylene-based polymer, or the like. Examples of a copolymer of ethylene and a functional monomer include ethylene-vinyl acetate copolymers (EVA), ethylene-acrylic acid copolymers (EAA), ethylene-methacrylic acid copolymers (EMAA), ethylene-methyl acrylate copolymers (EMA), ethylene-ethyl acrylate copolymers (EEA), ethylene-methyl methacrylate copolymers (EMMA), and copolymers of ethylene and (meth)acrylic acid (i.e. acrylic acid and/or methacrylic acid) crosslinked by metal ions.

The PE resin is not particularly limited in density. The concept of PE resin here includes all of the following: high density polyethylene (HDPE), medium density polyethylene (MDPE), low density polyethylene (LDPE) and linear low density polyethylene (LLPDE). In an embodiment, the density of the PE resin can be, for instance, about 0.90 g/cm$^3$ to 0.94 g/cm$^3$. Preferable PE resins include LDPE and LLDPE. The PE resin may comprise one, two or more species of LDPE and one, two or more species of LLDPE. There are no particular limitations to the respective blend ratios of LDPE and LLDPE, or to the LDPE to LLDPE blend ratio. They can be suitably selected to form a PE resin having desirable properties. As the substrate of the surface protection sheet disclosed herein, it is preferable to use polyethylenic resin film such as LLDPE film whose LLDPE content is higher than 50% by weight (preferably 75% by weight or higher, e.g. 90% by weight or higher) and LDPE film whose LDPE content is higher than 50% by weight (preferably 75% by weight or higher, e.g. 90% by weight or higher). Laminate resin film comprising such polyethylenic resin film as a component can be used as well.

The resin film (e.g. polyolefinic resin film) used as the substrate of the surface protection sheet disclosed herein may comprise, as necessary, suitable components allowable in the substrate. Examples of additives that can be suitably added include colorant such as pigments (typically inorganic pigments) and dyes, filler, antioxidant, photostabilizer (including radical scavenger and UV absorber), antistatic agent, plasticizer, slip agent, and anti-blocking agent. Each additive can be added, for instance, in an amount similar to the typical amount in the field of resin film used as a surface protection sheet substrate and the like.

The substrate may have a mono-layer structure or a multi-layer structure formed of two, three or more layers. In a multi-layer structure, it is preferable that at least one layer (preferably each layer) is of aforementioned resin film. For instance, in a preferable substrate, 75% or more (more preferably 90% or more) of the thickness is attributed to mono-layer or multi-layer (typically mono-layer) polyolefinic resin film. The entire substrate may be formed of mono-layer or multi-layer polyolefinic resin film. From an economical point of view, it is preferable to use a substrate formed of mono-layer resin film (e.g. LLDPE film, LDPE film, etc.).

The method for producing the substrate is not particularly limited. A heretofore known method can be suitably employed. For instance, when resin film is used as the substrate, resin film fabricated by suitably employing a heretofore known general film-molding method can be used, the method including inflation molding, extrusion molding, T-die casting, and calender roll molding.

In an embodiment where at least one face (the PSA layer-side face) of the substrate is a resin film surface, the resin film surface can be subjected to heretofore known surface treatment such as corona discharge treatment, plasma treatment, ozone exposure, flame exposure, UV irradiation, acid treatment, base treatment, and primer coating. Such surface treatment may be carried out to increase the tightness of adhesion between the substrate and the PSA layer, that is, the anchoring of the PSA layer to the substrate.

In an embodiment using polyolefinic resin film as the substrate, it is particularly significant to carry out the surface treatment.

<PSA Layer>

The type of PSA forming the PSA layer of the surface protection sheet disclosed herein is not particularly limited. The PSA may be formed from a PSA composition comprising, as the base polymer (the primary component among the polymers, i.e. a component accounting for 50% by weight or more), one, two or more species selected among various polymers (adhesive polymers), such as acrylic, polyester-based, urethane-based, polyether-based, rubber-based, silicone-based, polyamide-based, and fluorinated polymers. The art disclosed herein can be preferably made, for instance, as a surface protection sheet comprising an acrylic PSA.

The "acrylic PSA" here refers to a PSA comprising an acrylic polymer as the base polymer. The "acrylic polymer" refers to a polymer whose primary monomer (the primary component among the monomers, i.e. a component that accounts for 50% by weight or more of the total amount of the monomers forming the acrylic polymer) is a monomer having at least one (meth)acryloyl group per molecule. Such a monomer may be referred to as an "acrylic monomer" hereinafter. As used herein, the "(meth)acryloyl group" comprehensively refers to acryloyl group and methacryloyl group. Similarly, the "(meth)acrylate" comprehensively refers to acrylate and methacrylate.

(Acrylic Polymer)

A preferable example of the acrylic polymer is a polymer of a starting monomer mixture that comprises an alkyl (meth)acrylate (or a monomer A hereinafter) and may further comprise another monomer (or a monomer B hereinafter) that is copolymerizable with the alkyl (meth)acrylate. The acrylic polymer typically has a monomer unit composition corresponding to the monomer composition of the starting monomer mixture.

A preferable monomer A is an alkyl (meth)acrylate represented by the next general formula (1):

$$CH_2=C(R^1)COOR^2 \quad (1)$$

Here, $R^1$ in the formula (1) is a hydrogen atom or a methyl group. $R^2$ is an alkyl group having 1 to 20 carbon atoms. Hereinafter, such a range of the number of carbon atoms may be indicated as "$C_{1-20}$." From the standpoint of the polymerization reactivity, polymerization stability, etc., an alkyl (meth)acrylate wherein $R^2$ is a $C_{1-16}$ alkyl group is preferable, and an alkyl (meth)acrylate wherein $R^2$ is a $C_{1-12}$ (typically $C_{1-10}$, e.g. $C_1$) alkyl group is more preferable.

Examples of an alkyl (meth)acrylate with $R^2$ being a $C_{1-20}$ alkyl group include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, undecyl (meth)acrylate, lauryl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth)acrylate, etc. These alkyl (meth)acrylates can be used solely as one species or in a combination of two or more species.

Examples of compounds that can be used as the monomer B may include functional monomers such as those described below. These functional monomers may be useful for introducing crosslinking points into the acrylic polymer or for increasing the cohesiveness of the acrylic polymer.

Carboxy group-containing monomers: e.g. ethylenic unsaturated mono-carboxylic acids such as acrylic acid (AA), methacrylic acid (MAA), crotonic acid, carboxyethyl (meth)acrylate, and carboxypentyl (meth)acrylate; ethylenic unsaturated dicarboxylic acids such as itaconic acid, maleic acid, fumaric acid, and citraconic acid.

Acid anhydride group-containing monomers: e.g. acid anhydrides of the ethylenic unsaturated dicarboxylic acids such as maleic acid anhydride and itaconic acid.

Hydroxy group-containing monomers: e.g. hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, and 4-hydroxybutyl (meth)acrylate; unsaturated alcohols such as vinyl alcohol, allyl alcohol, 2-hydroxyethyl vinyl ether, 4-hydroxybutyl vinyl ether, and diethylene glycol monovinyl ether.

Amide group-containing monomers: for example, (meth)acrylamide, N,N-dimethyl(meth)acrylamide, N-butyl(meth)acrylamide, N-methylol(meth)acrylamide, N-methylolpropane(meth)acrylamide, N-methoxymethyl(meth)acrylamide, N-butoxymethyl(meth)acrylamide.

Imide group-containing monomers: e.g. N-isopropylmaleimide, N-cyclohexylmaleimide, itaconimide;

Amino group-containing monomers: e.g. aminoethyl (meth)acrylate, N,N-dimethylaminoethyl (meth)acrylate, N,N-dimethylaminopropyl (meth)acrylate, t-butylaminoethyl (meth)acrylate;

Epoxy group-containing monomers: e.g. glycidyl (meth)acrylate, methylglycidyl (meth)acrylate, allyl glycidyl ether;

Cyano group-containing monomers: e.g. acrylonitrile, methacrylonitrile; Keto group-containing monomers: e.g. diacetone (meth)acrylamide, diacetone (meth)acrylate, vinyl methyl ketone, vinyl ethyl ketone, allyl acetoacetate, vinyl acetoacetate;

Monomers having nitrogen atom-containing rings: e.g. N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam, N-(meth)acryloyl morpholine, N-(meth)acryloylpyrrolidone;

Alkoxysilyl group-containing monomers: e.g. (3-(meth)acryloxypropyl)trimethoxysilane, (3-(meth)acryloxypropyl)triethoxysilane, (3-(meth)acryloxypropyl)methyldimethoxysilane, (3-(meth)acryloxypropyl)methyldiethoxysilane.

Other examples of the compound that can be used as the monomer B include vinyl ester-based monomers such as vinyl acetate and vinyl propionate; aromatic vinyl compounds such as styrene, substituted styrenes (α-methylstyrene, etc.) and vinyltoluene; non-aromatic ring-containing (meth)acrylates such as cyclohexyl (meth)acrylate, t-butylcyclohexyl (meth)acrylate, cyclopentyl (meth)acrylate and isobornyl (meth)acrylate; aromatic ring-containing (meth)acrylates such as aryl (meth)acrylates (e.g. phenyl (meth)acrylate, benzyl (meth)acrylate), aryloxyalkyl (meth)acrylate (e.g. phenoxyethyl (meth)acrylate), arylalkyl (meth)acrylate (e.g. benzyl (meth)acrylate); olefinic monomers such as ethylene, propylene, isoprene, butadiene and isobutylene; chlorine-containing monomers such as vinyl chloride and vinylidene chloride; isocyanate group-containing monomers such as 2-(meth)acryloxyethylisocyanate; alkoxy group-containing monomers such as methoxymethyl (meth)

acrylate and ethoxyethyl (meth)acrylate; vinyl ether-based monomers such as methyl vinyl ether, ethyl vinyl ether and isobutyl vinyl ether.

Yet other examples of the compound that can be used as the monomer B include polyfunctional monomers. Specific examples of polyfunctional monomers include compounds having two or more (meth)acryloyl groups per molecule such as 1,6-hexanediol di(meth)acrylate, ethylene glycol di(meth)acrylate, pentaerythritol di(meth)acrylate, trimethylolpropane tri(meth)acrylate, dipentaerythritol hexa(meth)acrylate and methylene bisacrylamide. When using such a polyfunctional monomer, its amount used is not particularly limited. It is usually suitably 2% by weight or less (more preferably 1% by weight or less) of the total monomer content.

The monomer A content in the total monomer content can be, but is not particularly limited to, for instance, about 50% by weight or greater; it is suitably 60% by weight or greater, preferably 70% by weight or greater, more preferably 80% by weight or greater, or yet more preferably 85% by weight or greater. With the inclusion of the monomer A in a prescribed amount, the surface protection sheet can be favorably obtained with a reduced increase in peel strength to adherend (e.g. a metal plate) with aging. The art disclosed herein can be preferably implemented, for instance, in an embodiment where the monomer A content in the total monomer content is 90% by weight or greater. In an embodiment, the monomer A content can be 95% by weight or greater, or even 97% by weight or greater. The monomer A content can also be 100% by weight. In an embodiment using a monomer A and a monomer B together, from the standpoint of suitably obtaining the effects of the monomer B, the monomer A content in the total monomer content can be, for instance, 99.9% by weight or less; it is usually preferably 99.5% by weight or less, or more preferably 99% by weight or less.

When an aforementioned non-aromatic ring-containing (meth)acrylate is copolymerized in the acrylic polymer, the amount of the non-aromatic ring-containing (meth)acrylate can be selected so that, for instance, the combined amount of the non-aromatic ring-containing (meth)acrylate and the monomer A accounts for about 60% by weight or more of all the monomers forming the acrylic polymer. With the inclusion of the non-aromatic ring-containing (meth)acrylate and the monomer A in at least the prescribed combined amount, the surface protection sheet can be favorably made to be less susceptible to an increase in peel strength to adherend (e.g. a metal plate) with aging. In an embodiment, the ratio of the combined amount of the non-aromatic ring-containing (meth)acrylate and the monomer A to the total monomer content can be, for instance, 70% by weight or higher, 80% by weight or higher, 85% by weight or higher, or even 90% by weight or higher. From the standpoint of the ease of application, the cohesion, etc., the ratio of the combined amount of the non-aromatic ring-containing (meth)acrylate and the monomer A to the total monomer content is usually suitably 99.9% by weight or lower, preferably 99.5% by weight or lower, or more preferably 99% by weight or lower.

When an aforementioned functional group-containing monomer is copolymerized in the acrylic polymer, the ratio of the functional group-containing monomer to all the monomers forming the acrylic polymer is usually preferably 0.1% by weight or higher (typically 0.5% by weight or higher, e.g. 1% by weight or higher), and preferably 40% by weight or lower (typically 30% by weight or lower, e.g. 20% by weight or lower). For instance, when a carboxy group-containing monomer is copolymerized in the acrylic polymer, from the standpoint of the ease of application, the cohesion, etc., the ratio of the carboxy group-containing monomer to the total monomer content is usually preferably 0.1% by weight or higher (typically 0.3% by weight or higher, e.g. 0.5% by weight or higher), and preferably 20% by weight or lower (preferably 10% by weight or lower, typically 5% by weight or lower, e.g. 3% by weight or lower). When a hydroxy group-containing monomer is copolymerized in the acrylic polymer, from the standpoint of the ease of application, the cohesion, etc., the ratio of the hydroxy group-containing monomer to the total monomer content is usually preferably 0.001% by weight or lower (typically 0.02% by weight or higher, e.g. 0.05% by weight or higher), and suitably 10% by weight or lower (typically 5% by weight or lower, e.g. 3% by weight or lower).

(Tg of Base Polymer)

In the surface protection sheet disclosed herein, the PSA layer's base polymer (an acrylic polymer in an acrylic PSA layer) is not particularly limited in Tg. The Tg of the base polymer is usually suitably −70° C. or higher; it can be, for instance, −60° C. or higher. In the surface protection sheet according to a preferable embodiment, the base polymer of the PSA layer may have a Tg of −50° C. or higher. According to a base polymer having such a Tg, the PSA layer can be favorably formed to be suited to inhibiting the increase in peel strength with aging. In an embodiment where the base polymer has a Tg of −40° C. or higher (more preferably −35° C. or higher, or yet more preferably −30° C. or higher, e.g. −27° C. or higher), greater effects can be obtained. From the standpoint of the ease of application to adherends and prevention of displacement during processing, the base polymer's Tg is usually suitably 0° C. or lower, preferably −10° C. or lower, or more preferably −15° C. or lower. The base polymer's Tg can also be −17° C. or lower. The base polymer's Tg can be adjusted by suitably changing the monomer composition (i.e. the monomer species used in the synthesis of the polymer and their ratio).

In the present description, the Tg of a polymer refers to the value determined by the Fox equation based on the Tg values of homopolymers of the respective monomers forming the polymer and the weight fractions (copolymerization ratio by weight) of the monomers. As shown below, the Fox equation is a relational expression between the Tg of a copolymer and glass transition temperatures Tgi of homopolymers of the respective monomers constituting the copolymer.

$$1/Tg = \Sigma(Wi/Tgi)$$

In the Fox equation, Tg represents the glass transition temperature (unit: K) of the copolymer, Wi the weight fraction (copolymerization ratio by weight) of a monomer i in the copolymer, and Tgi the glass transition temperature (unit: K) of homopolymer of the monomer i.

As for the Tg values of homopolymers, the values given in publicly known documents are used. In particular, with respect to the monomers shown in Table 1, the values in the table are used as the Tg values of the respective homopolymers.

TABLE 1

| | | | |
|---|---|---|---|
| 2-Ethylhexyl acrylate | −70° C. | Acrylic acid | 106° C. |
| n-Butyl acrylate | −55° C. | Methacrylic acid | 228° C. |
| Ethyl acrylate | −20° C. | 2-hydroxyethyl acrylate | −15° C. |
| Methyl acrylate | 8° C. | 4-hydroxybutyl acrylate | −40° C. |
| n-Butyl methacrylate | 20° C. | Vinyl acetate | 32° C. |
| Methyl methacrylate | 105° C. | Styrene | 100° C. |

TABLE 1-continued

| Cyclohexyl acrylate | 15° C. | N-vinyl-2-pyrrolidone | 54° C. |
| Cyclohexyl methacrylate | 66° C. | Acrylonitrile | 104° C. |
| Isobornyl acrylate | 94° C. | Acrylamide | 165° C. |
| Isobornyl methacrylate | 180° C. | | |

With respect to the Tg values of homopolymers other than the examples listed above, the values given in Polymer Handbook (3rd edition, John Wiley & Sons, Inc., Year 1989) are used. With respect to a monomer for which two or more values are listed in the Polymer Handbook, the highest value is used. When no values are given in the Polymer Handbook, values obtained by the measurement method described in Japanese Patent Application Publication No. 2007-51272 are used.

The base polymer (typically an acrylic polymer) is preferably a copolymer of a monomer (monomer H) whose homopolymer has a Tg of 10° C. or higher and a monomer (monomer L) whose homopolymer has a Tg lower than 10° C. With the combined use of the monomer H and the monomer L, the base polymer's Tg can be suitably adjusted. The monomer H and the monomer L may individually correspond to the monomer A or to the monomer B.

The monomer H content in the total monomer content can be, for instance, 1% by weight or higher; it is usually suitably 5% by weight or higher, preferably 10% by weight or higher, or more preferably 15% by weight or higher. High monomer H content tends to increase the cohesion of the PSA and inhibit the increase in peel strength with aging to increase the efficiency of removal work. High monomer H content is also beneficial in lowering the minimum load $L_{min}$ of the unloading curve described later. The surface protection sheet disclosed herein can be preferably made in an embodiment where the monomer H content is 20% by weight or higher (more preferably 25% by weight or higher, or yet more preferably 30% by weight or higher, e.g. 35% by weight or higher). The monomer H content can be 40% by weight or higher. From the standpoint of the ease of application to adherends and prevention of displacement during processing, the monomer H content is usually suitably 70% by weight or lower, preferably 60% by weight or lower, or more preferably 50% by weight or lower. In some embodiments, the monomer H content can be, for instance, 45% by weight or lower.

Non-limiting examples of the monomer that can be preferably used as the monomer H in the acrylic polymer include methyl methacrylate, t-butyl methacrylate, isobutyl methacrylate, n-butyl methacrylate, cyclohexyl acrylate, cyclohexyl methacrylate, isobornyl acrylate, isobornyl methacrylate, vinyl acetate, acrylic acid, methacrylic acid, acrylonitrile, and acrylamide.

In an embodiment, the monomer H preferably comprises one, two or more species selected among alkyl (meth)acrylates and cycloalkyl (meth)acrylates. For instance, about 50% by weight or more (more preferably 70% by weight or more, e.g. 90% by weight or more) of the monomer H is preferably an alkyl (meth)acrylate or a cycloalkyl (meth)acrylate. A particularly preferable monomer H is methyl methacrylate (MMA). As used herein, the concept of cycloalkyl (meth)acrylate encompasses a monocyclic cycloalkyl (meth)acrylate such as cyclohexyl (meth)acrylate and a polycyclic cycloalkyl (meth)acrylate such as isobornyl (meth)acrylate.

The surface protection sheet disclosed herein can be preferably made in an embodiment where a monomer whose homopolymer has a Tg of 35° C. or higher (more preferably 60° C. or higher, e.g. 80° C. or higher) accounts for 50% by weight or more (more preferably 70% by weight or more, e.g. 90% by weight or more) of the monomer H. A base polymer (e.g. an acrylic polymer) having such a composition is favorable in lowering the minimum load $L_{min}$ of the unloading curve described later. In an embodiment, from the standpoint of the initial adhesion, etc., 50% by weight or more (more preferably 70% by weight or more) of the monomer H can be a monomer whose homopolymer has a Tg of 180° C. or lower (e.g. 150° C. or lower).

The surface protection sheet disclosed herein can be preferably made in an embodiment where a monomer whose homopolymer has a Tg of −25° C. or lower (more preferably −35° C. or lower, e.g. −45° C. or lower) accounts for 50% by weight or more (more preferably 70% by weight or more, e.g. 90% by weight or more) of the monomer L. According to a composition that comprises a monomer having such a low homopolymer Tg at a certain ratio or more of the monomer L, the monomer H can be used in a larger amount while keeping the base polymer's Tg at or below a certain temperature. This can be advantageous in lowering the minimum load $L_{min}$ of the unloading curve. In a preferable embodiment, 50% by weight or more (more preferably 70% by weight or more, e.g. 90% by weight or more) of the monomer L can be a monomer whose homopolymer has a Tg of −50° C. or lower (e.g. one, two or more species selected among BA, 2EHA, n-octyl acrylate, n-nonyl acrylate, isononyl acrylate and n-hexyl acrylate; preferably one or both of BA and 2EHA), or a monomer whose homopolymer has a Tg of −60° C. or lower (e.g. 2EHA).

(Synthesis of Base Polymer)

The method for obtaining the base polymer (e.g. an acrylic polymer) is not particularly limited. Known polymerization methods can be suitably employed, such as solution polymerization, emulsion polymerization, bulk polymerization, and suspension polymerization. Alternatively, it is also possible to employ photopolymerization involving irradiation of light such as UV (typically carried out in the presence of a photopolymerization initiator) and active energy ray irradiation polymerization such as radiation polymerization involving irradiation of radioactive rays such as β rays and γ rays. As the monomer supply method in solution polymerization and emulsion polymerization, a suitable method can be employed among the all-at-once method where all the starting monomer mixture is supplied in one portion, gradual supply method, portion-wise supply method, etc. The polymerization temperature can be suitably selected in accordance with the monomer species, the solvent species, and the polymerization initiator species used, etc. The polymerization temperature is usually suitably 20° C. or higher, preferably 40° C. or higher, more preferably 50° C. or higher; it can also be 60° C. or higher, 65° C. or higher, or even 70° C. or higher. The polymerization temperature is usually suitably 170° C. or lower (typically 140° C. or lower), or preferably 95° C. or lower (e.g. 85° C. or lower). In emulsion polymerization, the polymerization temperature is preferably 95° C. or lower (e.g. 85° C. or lower).

The solvent (polymerization solvent) used in solution polymerization can be suitably selected among heretofore known organic solvents. For instance, it is preferable to use aromatic compounds (typically aromatic hydrocarbons) such as toluene, acetic acid esters such as ethyl acetate, aliphatic or alicyclic hydrocarbons such as hexane and cyclohexane, and the like.

The initiator used in the polymerization can be suitably selected among known or commonly-used polymerization initiators in accordance with the monomer species and the type of polymerization method. For instance, azo-based polymerization initiators can be preferably used, such as 2,2'-azobisisobutyronitrile, 2,2'-azobis(2-methylpropionamidine) disulfate, and 2,2'-azobis(2-amidinopropane) dihydrochloride. Other examples of the polymerization initiator include persulfates such as potassium persulfate and ammonium persulfate; peroxide-based initiators such as benzoyl peroxide, t-butyl hydroperoxide, and hydrogen peroxide; substituted ethane-based initiators such as phenyl-substituted ethane; and aromatic carbonyl compounds. Yet other examples of the polymerization initiator include redox initiators by the combination of a peroxide and a reducing agent. Examples of the redox initiator include a combination of a peroxide (hydrogen peroxide, etc.) and ascorbic acid, a combination of a peroxide (hydrogen peroxide, etc.) and an iron(II) salt, and a combination of a persulfate salt and sodium hydrogen sulfite. These polymerization initiators can be used singly as one species or in a combination of two or more species. The polymerization initiator can be used in a usual amount. For instance, it can be selected from a range of about 0.005 part to 1 part by weight (typically 0.01 part to 1 part by weight) to 100 parts by weight of the total monomer content.

The surfactant (emulsifier) used in emulsion polymerization is not particularly limited. Commonly-known anionic surfactants, nonionic surfactants and the like can be used. A surfactant having a radically polymerizable functional group can also be used. Hereinafter, the surfactant having a radically polymerizable functional group is referred to as a reactive (polymerizing) surfactant. In contrast to this, a general surfactant free of a radically polymerizable functional group may be referred to as a non-reactive (non-polymerizing) surfactant. For the surfactant, solely one species or a combination of two or more species can be used. The amount of surfactant is usually preferably 0.1 part by weight or greater (e.g. 0.5 part by weight or greater) to 100 parts by weight of the total monomer content; and it is preferably 10 parts by weight or less (e.g. 5 parts by weight or less) to 100 parts by weight of the total monomer content.

Examples of the non-reactive surfactant include anionic emulsifiers such as sodium lauryl sulfate, ammonium lauryl sulfate, sodium dodecyl benzene sulfonate, sodium polyoxyethylene lauryl sulfate, sodium polyoxyethylene alkyl ether sulfates, ammonium polyoxyethylene alkyl phenyl ether sulfates, sodium polyoxyethylene alkyl phenyl ether sulfates, and sodium polyoxyethylene alkyl sulfosuccinates; and non-ionic emulsifiers such as polyoxyethylene alkyl ethers, polyoxyethylene alkyl phenyl ethers, polyoxyethylene aliphatic acid esters, and polyoxyethylene-polyoxypropylene block polymers.

The reactive surfactant is not particularly limited as far as it has a radically polymerizable functional group. For instance, the reactive surfactant may have a structure such that a radically polymerizable functional group is incorporated in an aforementioned anionic surfactant or nonionic surfactant. Examples of the radically polymerizable functional group include vinyl group, propenyl group, isopropenyl group, vinyl ether group (vinyloxy group), and allyl ether group (allyloxy group). The concept of propenyl group referred to herein encompasses 1-propenyl group ($CH_3$—CH=CH—) and 2-propenyl group ($CH_2$=CH—$CH_2$— which may be called allyl group).

Examples of an anionic reactive surfactant include polyoxyethylene (allyloxymethyl) alkyl ether sulfates (e.g. ammonium salts), polyoxyethylene nonyl propenyl phenyl ether sulfates (e.g. ammonium salts), alkyl allyl sulfosuccinates (e.g. sodium salts), methacryloxy polyoxypropylene sulfuric acid ester salts (e.g. sodium salts), and polyoxyalkylene alkenyl ether sulfates (e.g. an ammonium salt having an isopropenyl group as the terminal alkenyl group). When the anionic reactive surfactant is forming a salt, the salt can be, for instance, a metal salt such as sodium salt or a non-metal salt such as ammonium salt and amine salt.

Examples of a nonionic reactive surfactant include polyoxyethylene nonyl propenyl phenyl ether.

Commercially available reactive surfactants include products of Dai-ichi Kogyo Seiyaku Co., Ltd., under trade names AQUALON HS-05, AQUALON HS-10, AQUALON HS-1025, AQUALON HS-20, AQUALON KH-10, AQUALON KH-1025, AQUALON KH-05, AQUALON BC-0515, AQUALON BC-10, AQUALON BC-1025, AQUALON BC-20, AQUALON BC-2020, AQUALON RN-20, AQUALON RN-30 and AQUALON RN-50; products of ADEKA corporation, under trade names ADEKARIA SOAP SE-10N and ADEKARIA SOAP SR-1025; products of Kao Corporation, under trade names LATEMULE PD-104, LATEMULE PD-420, LATEMULE PD-430 and LATEMULE PD-450; products of Sanyo Chemical Industries, Ltd., under trade names ELEMINOL JS-20 and ELEMINOL RS-3000; and a product of Nippon Nyukazai Co., Ltd., under trade name ANTOX MS-60.

Although no particular limitations are imposed, in some embodiments, a reactive surfactant having an oxyethylene chain can be preferably used. The oxyethylene chain refers to a structure of repeating oxyethylene units, that is, a structural moiety represented by —$(C_2H_4O)_n$—, with n indicating the number of repeats of the oxyethylene unit. For instance, in a preferable reactive surfactant, the number of repeats, n, is about 5 to 30 (e.g. 8 to 25).

From the standpoint of the polymerization stability during the emulsion polymerization, in some embodiments, it is preferable to use a reactive surfactant having a propenyl group. A preferable reactive surfactant has a propenyl group and also an oxyethylene chain.

From the standpoint of the emulsifying ability, etc., in some embodiments, an anionic reactive surfactant (e.g. an anionic reactive surfactant having an oxyethylene chain) can be preferably used. When the anionic reactive surfactant is in a salt form, as the salt, a non-metal salt is preferable from the standpoint of preventing marking on the adherend surface (e.g. a paint film surface). In particular, an ammonium salt is preferable.

When using a nonionic reactive surfactant, more favorable results can be obtained by the combined use with other surfactant(s), such as an anionic reactive surfactant, anionic non-reactive surfactant and nonionic non-reactive surfactant.

By carrying out emulsion polymerization of the starting monomer mixture in the presence of a reactive surfactant having a radically polymerizable functional group, the reactive surfactant may undergo a reaction to be incorporated into the acrylic polymer. The reactive surfactant incorporated in the acrylic polymer is unlikely to bleed out to the PSA layer surface because its move within the PSA layer is limited. Accordingly, the use of the reactive surfactant can reduce bleed-out of a low molecular weight compound to the PSA layer surface. This is preferable from the standpoint of the low-contaminating properties of the surface protection sheet. From the standpoint of obtaining greater low-contaminating properties, it is preferable to apply an embodiment using solely a reactive surfactant as the surfactant for emulsion polymerization.

In the emulsion polymerization, as necessary, various heretofore known chain transfer agents (which can be considered also as a molecular weight-adjusting agent or polymerization degree-adjusting agent) can be used. For the chain transfer agent, solely one species or a combination of two or more species can be used. As the chain transfer agent, mercaptans can be preferably used, such as n-dodecyl mercaptan, t-dodecyl mercaptan, and thioglycolic acid. When using a chain transfer agent, its amount can be, for instance, about 0.01 part to 1 part by weight to 100 parts by weight of the total monomer content. The art disclosed herein can also be preferably practiced in an embodiment that uses no chain transfer agent.

<PSA Composition>

The PSA layer of the surface protection sheet disclosed herein can be formed from various forms of PSA compositions. Examples of the forms of PSA compositions include a solvent-based PSA composition containing the PSA (adhesive component(s)) in an organic solvent, a water-dispersed PSA composition containing the PSA dispersed in an aqueous solvent, an active energy ray-curable PSA composition formulated so as to cure with active energy rays such as UV rays and radioactive rays to form PSA, and a hot-melt PSA composition which is applied in the molten state by heating and forms PSA when it cools to near room temperature.

From the standpoint of reducing environmental stress, an aqueous PSA composition can be preferably used. A favorable example of the aqueous PSA composition is an aqueous PSA composition (an acrylic aqueous PSA composition, typically an acrylic emulsion PSA composition) comprising an acrylic polymer as the base polymer.

(Crosslinking Agent)

In the surface protection sheet disclosed herein, the PSA composition used to form the PSA layer may comprise a crosslinking agent as necessary. The use of the crosslinking agent allows for suitable adjustment of the gel fraction $G_C$ and the sol molecular weight $S_{Mw}$. The type of crosslinking agent used is not particularly limited and can be suitably selected from heretofore known crosslinking agents.

The amount of the crosslinking agent used is not particularly limited. In view of the base polymer's composition and the weight average molecular weight, it can be suitably selected so as to obtain favorable properties when crosslinked. The amount of the crosslinking agent used to 100 parts by weight of the base polymer (typically an acrylic polymer) can be, but is not particularly limited to, for instance, 0.01 part by weight or greater (typically 0.05 part by weight or greater). From the standpoint of the stability of peel strength with aging, etc., the amount of the crosslinking agent is usually suitably 15 parts by weight or less (preferably 10 parts by weight or less, e.g. 5 parts by weight or less) to 100 parts by weight of the base polymer.

Specific examples of the crosslinking agent include oxazoline-based crosslinking agents, aziridine-based crosslinking agents, isocyanate-based crosslinking agents, epoxy-based crosslinking agents, melamine-based crosslinking agents, peroxide-based crosslinking agents, urea-based crosslinking agents, metal alkoxide-based crosslinking agents, metal chelate-based crosslinking agents, metal salt-based crosslinking agents, carbodiimide-based crosslinking agents, hydrazine-based crosslinking agents, amine-based crosslinking agents, and silane coupling agents. These can be used solely as one species or in a combination of two or more species. For instance, it is preferable to use one, two or more species selected from a group consisting of oxazoline-based crosslinking agents, aziridine-based crosslinking agents, isocyanate-based crosslinking agents and epoxy-based crosslinking agents. In an embodiment, an oxazoline-based crosslinking agent can be preferably used.

As the oxazoline-based crosslinking agent, a species having one or more oxazoline groups per molecule can be used without particular limitations. In the water-dispersed PSA composition, it is preferable to use a water-soluble or water-dispersible oxazoline-based crosslinking agent.

The oxazoline group can be either 2-oxazoling group, 3-oxazoline group or 4-oxazoline group. Usually, a 2-oxazoline group-containing oxazoline-based crosslinking agent can be preferably used. As the oxazoline-based crosslinking agent, a water-soluble copolymer or a water-dispersed copolymer can be used, which is obtained by copolymerizing an addition-polymerizable oxazoline such as 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline with other monomer(s).

Examples of a commercial oxazoline-based crosslinking agent include products of Nippon Shokubai Co., Ltd., under trade names EPOCROS WS-500, EPOCROS WS-700, EPOCROS K-2010E, EPOCROS K-2020E and EPOCROS K-2030E.

Examples of the aziridine-based crosslinking agent include trimethylolpropane tris[3-(1-aziridinyl)propionate] and trimethylolpropane tris[3-(1-(2-methyl)aziridinylpropionate)].

Examples of the isocyanate-based crosslinking agent include aromatic isocyanates such as tolylene diisocyanates and xylylene diisocyanate; alicyclic isocyanates such as isophorone diisocyanate; and aliphatic isocyanates such as hexamethylene diisocyanate. More specific examples include isocyanate adducts such as trimethylolpropane/tolylene diisocyanate trimer adduct (trade name CORONATE L available from Tosoh Corporation), trimethylolpropane/hexamethylene diisocyanate trimer adduct (trade name CORONATE HL available from Tosoh Corporation) and hexamethylene diisocyanate isocyanurate (trade name CORONATE HX available from Tosoh Corporation). In the water-dispersed PSA composition, it is preferable to use an isocyanate-based crosslinking agent that is soluble or dispersible in water. For instance, a water-soluble, water-dispersible or self-emulsifying isocyanate-based crosslinking agent can be preferably used. A so-called blocked isocyanate-based crosslinking agent can be preferably used as a isocyanate-based crosslinking agent.

As the epoxy-based crosslinking agent, a species having two or more epoxy groups per molecule can be used without particular limitations. An epoxy-based crosslinking agent having 3 to 5 epoxy groups per molecule is preferable. In the water-dispersed PSA composition, it is preferable to use a water-soluble or water-dispersible epoxy-based crosslinking agent.

Specific examples of the epoxy-based crosslinking agent include N,N,N',N'-tetraglycidyl-m-xylenediamine, 1,3-bis(N,N-diglycidylaminomethyl)cyclohexane, 1,6-hexanediol diglycidyl ether, polyethylene glycol diglycidyl ether, and polyglycerol polyglycidyl ether.

Commercial epoxy-based crosslinking agents include products of Mitsubishi Gas Chemical Co., Inc., under trade names TETRAD-X and TETRAD-C, a product of DIC Corporation under trade name EPICLON CR-5L, a product of Nagase ChemteX Corporation under trade name DENACOL EX-512, and a product of Nissan Chemical Industries, Ltd., under trade name TEPIC-G.

As the carbodiimide-based crosslinking agent, a lower or higher molecular weight compound having two or more carbodiimide groups can be used. In an aqueous PSA composition, it is preferable to use a water-soluble or water-dispersible carbodiimide-based crosslinking agent. Examples of commercial carbodiimide-based crosslinking agents include the CARBODILITE series such as the CARBODILITE V series (aqueous solutions) including CARBODILITE V-02, CARBODILITE V-02-L2, and CARBODILITE V-04; and the CARBODILITE E series (aqueous dispersions) including CARBODILITE E-01, CARBODILITE E-02, and CARBODILITE E-04 available from Nisshinbo Holdings, Inc.

(Release-Adjusting Agent)

The PSA layer disclosed herein can comprise a release-adjusting agent (peel strength adjuster). The release-adjusting agent in the PSA layer can move to the PSA layer surface with aging to inhibit the increase in peel strength and contribute to increase the efficiency of removal. The use of the release-adjusting agent makes it easier to favorably combine tightness of adhesion to the adherend being protected and light peelability during removal of the protection sheet. The release-adjusting agent disclosed herein is typically a compound having a hydrophobic group and a hydrophilic group, with favorable examples thereof including surfactants such as anionic surfactants and nonionic surfactants. An aliphatic acid amide can also be used as the release-adjusting agent. For the release-adjusting agent, solely one species or a combination of two or more species can be used. The release-adjusting agent can be used in the polymerization or can be added after the polymerization. In a preferable embodiment, the release-adjusting agent can be used in the polymerization (e.g. in emulsion polymerization). In another preferable embodiment, the release-adjusting agent is added after the polymerization, that is, the release-adjusting agent is mixed with the base polymer that has been synthesized in advance.

Non-limiting examples of the surfactant that can be used as the release-adjusting agent include anionic surfactants such as carboxylates, sulfonates, sulfates, and phosphoric acid esters; nonionic surfactants such as ester types, ether types, ester-ether types, and aliphatic acid alkanolamide types having an amide bond between a hydrophobic group and a hydrophilic group; cationic surfactants such as amine salt types, and quaternary ammonium salt types.

In an embodiment of the surface protection sheet disclosed herein, a phosphoric acid ester-based surfactant can be preferably used as the release-adjusting agent. Example of the phosphoric acid ester include alkylphosphoric acid esters such as lauryl phosphoric acid, and lauryl phosphate; polyoxyethylene alkylphosphoric acid esters such as polyoxyethylene tridecyl ether phosphate, polyoxyethylene lauryl ether phosphate, and polyoxyethylene octadecyl ether phosphate; and polyoxyethylene alkyl aryl phosphoric acid esters such as polyoxyethylene nonyl phenyl ether phosphate, polyoxyethylene octyl phenyl ether phosphate, polyoxyethylene dinonyl phenyl ether phosphate, and polyoxyethylene dioctyl phenyl ether phosphate. From the standpoint of preventing their transfer to the adherend, etc., in an embodiment, a phosphoric acid ester having a weight average molecular weight of 150 to 5000 can be preferably used. Among these phosphoric acid esters, the phosphoric acid ester-based surfactant may comprise solely one species, or two or more species together. Each phosphoric acid ester in the phosphoric acid ester-based surfactant can be a monoester, a diester, or a mixture of these.

For the phosphoric acid ester-based surfactant, solely one species or a combination of two or more species can be used. The phosphoric acid ester-based surfactant can be used in combination with other surfactant(s). The phosphoric acid ester-based surfactant can be used by itself, in a salt form (e.g. a sodium salt, a potassium salt, a barium salt, a triethanolamine salt, etc.) or as a mixture of these.

The amount of the release-adjusting agent is usually suitably about 0.01 part to 30 parts by weight relative to 100 parts by weight of the base polymer. When the release-adjusting agent content is 0.01 part by weight or higher, the removability tends to increase. When the release-adjusting agent content is 30 parts by weight or lower, the PSA layer adheres tightly to the adherend and contamination of the adherend tends to be prevented as well. The release-adjusting agent content is preferably 0.1 part by weight or higher (e.g. 0.5 part by weight or higher, typically 1 part by weight or higher), and preferably 10 parts by weight or lower (e.g. 5 parts by weight or lower, typically 3 parts by weight or lower) to 100 parts by weight of the base polymer.

The PSA composition can comprise, as necessary, a known tackifier such as a rosin-based tackifier, terpene-based tackifier and hydrocarbon-based tackifier. From the standpoint of avoiding an excessive increase in peel strength, the amount of tackifier is preferably 5 parts by weight or less to 100 parts by weight of the base polymer, or more preferably 1 part by weight or less. For the surface protection sheet disclosed herein, the adhesive strength can be effectively controlled by the PSA's gel fraction $G_C$ and sol molecular weight $S_{Mw}$; and therefore, the surface protection sheet can be preferably made in an embodiment using no tackifier as well.

The PSA composition may comprise, as necessary, various additives generally known in the field of PSA compositions, such as leveling agent, crosslinking accelerator, plasticizer, softener, filler, anti-static agent, anti-aging agent, UV-absorber, antioxidant and photo-stabilizing agent. With respect to these various additives, heretofore known species can be used by typical methods. Because these additives do not characterize the present invention in particular, details are omitted.

<PSA Layer>

As for the method for providing the PSA layer to the substrate, it is possible to employ a direct method where the PSA composition as described above is directly provided (typically applied) to the substrate and subjected to a curing treatment; a transfer method where the PSA composition is applied to a suitable release face (e.g. a releasable surface of a transfer sheet) and subjected to a curing treatment to form a PSA layer on the surface followed by adhering and transferring the PSA layer to the substrate; and so on. The curing treatment may comprise one, two or more processes selected among drying (heating), cooling, crosslinking, supplemental copolymerization reaction, aging, etc. The curing treatment referred to herein also encompasses, for instance, a process (heating process, etc.) simply to allow a PSA composition containing a solvent to dry, a process simply to cool down (solidify) a heat-melted PSA composition. When the curing treatment comprises two or more processes (e.g. drying and crosslinking), these processes may be performed at once or stepwise.

The PSA composition can be applied, for instance, using a commonly used coater such as a gravure roll coater, reverse roll coater, kiss roll coater, dip roll coater, bar coater, knife coater and spray coater. From the standpoint of accelerating the crosslinking reaction, increasing the productivity, etc., the PSA composition is preferably dried with heat. The drying temperature may vary depending on the object (a substrate, etc.) to which the PSA composition is applied, but it can be, for instance, about 40° C. to 150° C.

(Gel Fraction $G_C$)

In the surface protection sheet disclosed herein, the gel fraction $G_C$ of the PSA forming the PSA layer is not particularly limited. It can be, for instance, 40% or higher (typically 50% or higher). In an embodiment, the gel fraction $G_C$ of the PSA is suitably 60% or higher, preferably 65% or higher, more preferably 70% or higher, or yet more preferably 75% or higher. The PSA's gel fraction $G_C$ can also be, for instance, 80% or higher. With increasing gel fraction $G_C$, the cohesion of the PSA tends to increase, reducing leftover adhesive residue on the adherend (i.e. cohesive failure of the PSA layer during removal by peeling). The surface protection sheet disclosed herein can also be favorably made in an embodiment where the gel fraction $G_C$ is 85% or higher (e.g. 90% or higher). The maximum gel fraction $G_C$ is theoretically 100%. In some embodiments, from the standpoint of simultaneously obtaining a preferable sol molecular weight $S_{Mw}$ disclosed herein, the gel fraction $G_C$ can be, for instance, 98% or lower, or even 95% or lower (e.g. 90% or lower). The surface protection sheet disclosed herein can be favorably made in an embodiment where the gel fraction $G_C$ is 80% or lower (e.g. 70% or lower). The gel fraction $G_C$ can be adjusted by the selection of, for instance, the base polymer composition, the polymerization method and conditions for the base polymer, the molecular weight of the base polymer, the presence of a crosslinking agent as well as its type and amount used if any, and so on. The gel fraction $G_C$ is measured by the method described below. The same method is used for the working examples described later.

[Measurement of Gel Fraction $G_C$]

A PSA sample (weight: $W_{g1}$) weighing approximately 0.1 g is wrapped into a pouch with a porous polytetrafluoroethylene membrane (weight: $Wg_2$) having an average pore diameter of 0.2 μm, and the opening is tied with twine (weight: $Wg_3$). As the porous polytetrafluoroethylene membrane, trade name NITOFLON® NTF 1122 (available from Nitto Denko Corp.; 0.2 μm average pore diameter, 75% porosity, 85 μm thickness) or an equivalent product can be used. The resulting package is immersed in 50 mL of toluene and stored at room temperature (typically 23° C.) for 7 days to extract only the sol fraction of the PSA out of the membrane. Subsequently, the package is taken out, and any residual toluene is wiped off the outer surface. The package is then dried at 130° C. for 2 hours and the package weight ($Wg_4$) is measured. The gel fraction Gc of the PSA is determined by substituting the respective values into the following equation:

Gel Fraction $Gc(\%)=[(Wg_4-Wg_2-Wg_3)/Wg_1]\times 100$

A PSA sample used for the measurement of gel fraction $G_C$ can be collected from the PSA layer of the surface protection sheet. Alternatively, PSA obtained from the PSA composition used for forming the PSA layer can be used as the PSA sample. For instance, the PSA composition can be dried at 130° C. for three minutes to form an approximately 35 μm thick PSA layer; and a PSA sample can be collected from the PSA layer to measure the gel fraction $G_C$.

(Sol Molecular Weight $S_{Mw}$)

The PSA is not particularly limited in sol molecular weight $S_{Mw}$. From the standpoint of preventing contamination of the adherend, etc., the sol molecular weight $S_{Mw}$ is usually suitably $1\times10^4$ or higher, or preferably $5\times10^4$ or higher (e.g. $7\times10^4$ or higher). The surface protection sheet disclosed herein can be favorably made in an embodiment where the PSA's sol molecular weight $S_{Mw}$ is $10\times10^4$ or higher. With increasing Mw of sol fractions (toluene-soluble fractions) with higher mobility than the gel, the progress of wetting of the adherend surface with the adhesive face is retarded and the increase in peel strength with aging tends to be effectively inhibited. From such a standpoint, the PSA's sol molecular weight $S_{Mw}$ is preferably $20\times10^4$ or higher, or more preferably $30\times10^4$ or higher; it can be, for instance, $40\times10^4$ or higher. From the standpoint of simultaneously achieving at least the prescribed gel fraction $G_C$, the PSA's sol molecular weight $S_{Mw}$ is usually suitably $100\times10^4$ or lower, preferably $80\times10^4$ or lower, or more preferably $70\times10^4$ or lower; it can be, for instance, $65\times10^4$ or lower. In some embodiments, the PSA's sol molecular weight $S_{Mw}$ can be, for instance, lower than $40\times10^4$, lower than $35\times10^4$, or even lower than $30\times10^4$. The surface protection sheet disclosed herein can also be favorably implemented with such a sol molecular weight $S_{Mw}$.

The sol molecular weight $S_{Mw}$ can be determined as the weight average molecular weight based on standard polystyrene by suspending the surface protection sheet in toluene at room temperature for 48 hours to extract toluene-soluble fractions from the PSA layer, evaporating the toluene, dissolving the remaining residue in tetrahydrofuran (THF) and analyzing the resulting solution by GPC (gel permeation chromatography). As the GPC system, model name HLC-8320 GPC available from Tosoh Corporation can be used. The measurement conditions can be as shown below. The same method is used in the working examples described later

[GPC Measurement Conditions]
  Columns: TSK gel GMH-H(S), 2 columns connected
  Column size: 7.8 mm I.D.×300 mm
  Detector: differential refractometer
  Eluent: THF
  Flow rate: 0.6 mL/min
  Measurement temperature: 40° C.
  Sample injection volume: 100 μL When the gel fraction $G_C$ increases upon the addition of the crosslinking agent to the base polymer, the sol molecular weight $S_{Mw}$ generally tends to decrease. According to the art disclosed herein, by increasing the sol molecular weight $S_{Mw}$ at or above the prescribed gel fraction $G_C$, the surface protection sheet can be favorably made less likely to cause leftover adhesive residue while the increase in peel strength with aging is effectively reduced.

The sol molecular weight $S_{Mw}$ can be adjusted by the selection of, for instance, the base polymer composition, the polymerization method and conditions (polymerization temperature, the species of polymerization initiator used and its amount, the type of polymerization solvent, the monomer supply mode, etc.) for the base polymer, the molecular weight of the base polymer, the presence of a crosslinking agent as well as its type and amount used if any, and so on. More specifically, for instance, with increasing monomer concentration of the reaction system in the synthesis of the base polymer (typically an acrylic polymer), the sol molecular weight $S_{Mw}$ generally tends to increase. As the method for increasing the monomer concentration of the reaction system, for instance, it is possible to employ a method where the rate of supplying the monomers is further increased in an embodiment of polymerization where the monomers are continuously supplied to the reaction vessel. It is noted that when the temperature is not appropriately controlled in the polymerization reaction system (e.g. when the temperature becomes not uniform, as in a case where the polymerization temperature becomes partially excessively high in the reaction system due to insufficient stirring or insufficient cooling), lower molecular weight compounds may form, decreasing the sol molecular weight $S_{Mw}$. Based on the disclosure of the present description including the specific working examples described later as well as the technical common knowledge at the time of filing this application, a skilled person may figure out a method that achieves a favorable sol molecular weight $S_{Mw}$ disclosed herein and a method that achieves a favorable gel fraction $G_C$ and a favorable sol molecular weight $S_{Mw}$ at the same time.

(Minimum Load $L_{min}$ of Unloading Curve by Nanoindentation)

The surface protection sheet disclosed herein preferably shows an unloading curve having a minimum load $L_{min}$ of less than −2.0 µN in nanoindentation of the PSA layer. A negative load applied to the indenter during unloading indicates resistance against pull-out of the indenter that has been indented into the PSA layer and further suggests that the PSA has high cohesive strength. With such a PSA layer, wetting of the adherend surface with the adhesive face is retarded. Thus, according to a surface protection sheet having such a PSA layer, the increase in peel strength with aging tends to be favorably inhibited.

Figure 2:
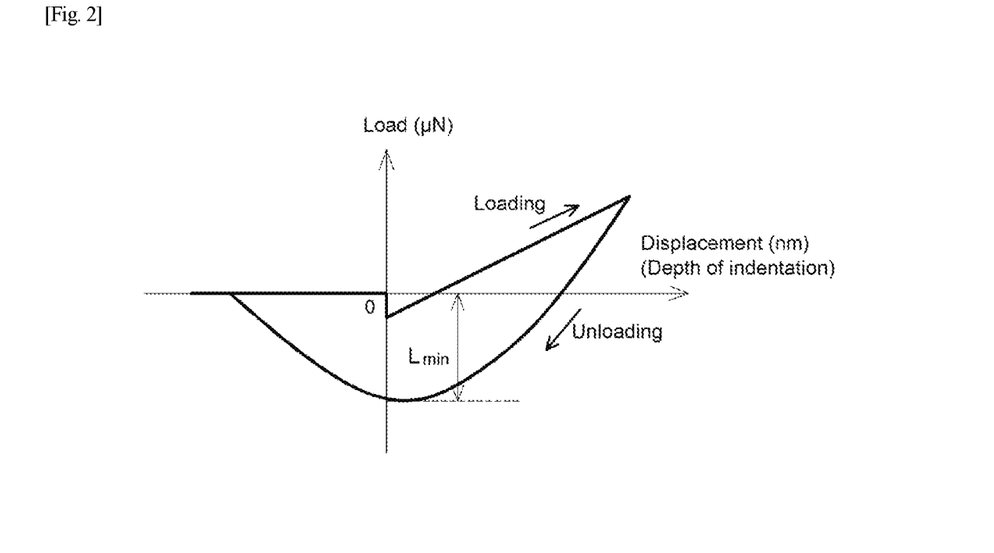
FIG. 2 shows a schematic plot illustrating an unloading curve by nanoindentation and the minimum load of the unloading curve.

As schematically illustrated in FIG. 2, the minimum load $L_{min}$ of the unloading curve is determined as the minimum (smallest) load of the unloading curve in the loading (indentation)-unloading (pull-out) curve obtained by nanoindentation where a nanoindenter is indented from the PSA layer surface (adhesive face) into the PSA layer and subsequently pulled out, and plotting the changes in load applied to the indenter (vertical axis) vs. displacement of indenter relative to the adhesive face (horizontal axis). According to the nanoindentation, for instance, even with respect to thin PSA layers such as those in the working examples described later, while keeping the influence of the substrate at a negligible level, the behavior of the PSA layer itself can be appropriately evaluated.

The nanoindentation can be carried out, for instance, using TRIBOINDENTER available from Hysitron, Inc., under the conditions shown below. The same method is used in the working examples described later.

[Conditions for Nanoindentation]
Indenter used: Berkovich (trigonal pyramid) diamond indenter
Measurement method: Single indentation measurement
Measurement temperature: room temperature (25° C.)
Indentation depth: set at 300 nm
Rate of indentation: 100 nm/sec
Rate of removal: 100 nm/sec In the surface protection sheet according to an embodiment, the minimum load $L_{min}$ of the unloading curve is preferably −2.5 µN or less, more preferably −3.0 µN or less, or yet more preferably −4.0 µN or less. The minimum load $L_{min}$ of the unloading curve can be −4.5 µN or less, or even −5.0 µN or less, for instance, −6.0 µN or less. The lower limit of the minimum load $L_{min}$ of the unloading curve is not particularly limited. From the standpoint of the ease of application to adherend and the protection of the adherend in the embodiment of use, it is usually suitably −10 µN or greater.

Examples of possibly effective means to lower the minimum load $L_{min}$ of the unloading curve include increasing the Tg of the base polymer of the PSA layer, and increasing the sol molecular weight $S_{Mw}$. Other features that can be used for adjusting the minimum load $L_{min}$ of the unloading curve include the gel fraction $G_C$, the base polymer composition (e.g. the monomer species used in the polymer synthesis, the ratio of the monomer H to the total monomer content, etc.), the polymerization method and conditions for the base polymer, and the type of crosslinking agent and its amount used.

<Properties of Surface Protection Sheet>
(Mid-Rate Peel Strength)

The surface protection sheet disclosed herein preferably has an aged peel strength $P_A$ of about 0.70 N/20 mm or less, determined at a peeling rate of 3 m/min (i.e. 50 mm/sec), at 180° peel angle, after adhered to a stainless steel plate (SUS plate) and stored at 60° C. for seven days (or aged mid-rate peel strength $P_A$, hereinafter). By this, the surface protection sheet can maintain the light peelability from adherends even when it is adhered to an adherend such as a metal plate for a relatively long time. Thus, the load applied to the surface protection sheet during the removal from the adherend decreases and the surface protection sheet becomes less susceptible to tearing and ripping. This increases the efficiency of removal from the adherend. With the surface protection sheet having an aged mid-rate peel strength $P_A$ of 0.60 N/20 mm or less (more preferably 0.50 N/20 mm or less), greater efficiency of removal can be obtained. In an embodiment, the aged mid-rate peel strength $P_A$ can be 0.40 N/20 mm or less, or even 0.30 N/20 mm or less. From the standpoint of inhibiting lifting and peeling while the adherend is protected (e.g. during processing of the adhered with the surface protection sheet adhered thereon), the aged mid-rate peel strength $P_A$ is usually suitably 0.05 N/20 mm or greater, preferably 0.10 N/20 mm or greater, or more preferably 0.15 N/20 mm or greater. The aged mid-rate peel strength $P_A$ is determined by the method described later in the working examples.

The surface protection sheet disclosed herein preferably has an initial peel strength $P_0$ of 0.50 N/20 mm or less (more preferably 0.40 N/20 mm or less, e.g. 0.30 N/20 mm or less), determined at a peeling rate of 3 m/min, at 180° peel angle, at 15 minutes after adhered to a SUS plate (or initial mid-rate peel strength $P_0$, hereinafter). Even in an embodiment of use where the surface protection sheet is applied to an adherend such as a metal plate, and the adherend is processed in relatively short time and is subsequently peeled away from the adherend, such a surface protection sheet can provide great efficiency of removal from the adherend. From the standpoint of the ease of application to an adherend, protection of the adherend in the embodiment of use, etc., the initial mid-rate peel strength $P_0$ is usually suitably 0.05 N/20 mm or greater, preferably 0.10 N/20 mm or greater, or more preferably 0.15 N/20 mm or greater; it can be even 0.20 N/20 mm or greater. The initial mid-rate peel strength $P_0$ is measured by the method described later in the working examples.

While no particular limitations are imposed, the surface protection sheet disclosed herein may have a ratio of aged mid-rate peel strength $P_A$ (N/20 mm) to initial mid-rate peel strength $P_0$ (N/20 mm) (i.e. a $P_A/P_0$ ratio value) of 5.0 or lower, typically 3.0 or lower, e.g. 2.5 or lower. A small $P_A/P_0$ ratio value indicates that the increase in peel strength with aging is small. By this, initial adhesion and light peelability during removal are favorably combined. From such a standpoint, the $P_A/P_0$ ratio is preferably 2.0 or lower; it can be 1.8 or lower, 1.5 or lower, or even 1.3 or lower. The $P_A/P_0$ ratio is typically 0.5 or higher; it can be, for instance, 0.7 or higher.

(Low-Rate Peel Strength)

The surface protection sheet disclosed herein preferably has an aged peel strength $P_B$ (or aged low-rate peel strength $P_B$, hereinafter) of about 1.5 N/20 mm or less (more preferably 1.0 N/20 mm or less, e.g. 0.8 N/20 mm or less), determined at a peeling rate of 0.3 m/min, at 180° peel angle, after adhered to a SUS plate and stored at 60° C. for seven days. Even if it is adhered on an adherend such as a metal plate for a relatively long time, such a surface protection sheet may be less susceptible to the occurrence of leftover adhesive residue on the adherend. Low aged low-rate peel strength $P_B$ is preferable also from the standpoint of increasing the efficiency of removal from the adherend. From the standpoint of inhibiting lifting and peeling while the adherend is protected (e.g. during processing of the adhered with the surface protection sheet adhered thereon), the aged low-rate peel strength $P_B$ is usually suitably 0.05 N/20 mm or greater, preferably 0.10 N/20 mm or greater, or more preferably 0.15 N/20 mm or greater. The aged low-rate peel strength $P_B$ is measured by the method described later in the working examples.

The surface protection sheet disclosed herein suitably has an initial peel strength $P_1$ (or initial low-rate peel strength $P_0$, hereinafter) of about 0.05 N/20 mm or greater, determined at a peeling rate of 0.3 m/min, at 180° peel angle, at 15 minutes after adhered to a SUS plate. Even in an embodiment of use where the surface protection sheet is applied to an adherend such as a metal plate, and the adherend is processed in relatively short time, such a surface protection sheet is less likely to lift, peel, etc., from the adherend and can provide good protection. In an embodiment, the initial low-rate peel strength $P_1$ can be 0.10 N/20 mm or greater (e.g. 0.15 N/20 mm or greater). The upper limit of the initial low-rate peel strength $P_1$ is not particularly limited. From the standpoint of well preventing leftover adhesive residue on the adherend, it is usually suitably 0.70 N/20 mm or less, or preferably 0.50 N/20 mm or less (e.g. 0.40 N/20 mm or less). The initial low-rate peel strength $P_1$ is determined by the same method as for the measurement of the initial mid-rate peel strength $P_0$ described later in the working examples except that the tensile speed is 0.3 m/min.

In the surface protection sheet disclosed herein, the ratio of aged low-rate peel strength $P_B$ (N/20 mm) to initial low-rate peel strength $P_1$ (N/20 mm) (i.e. the $P_B/P_1$ ratio value) is not particularly limited. It can be, for instance, 5.0 or lower (typically 4.0 or lower). The $P_B/P_1$ ratio value is typically 0.5 or higher; it can be, for instance, 0.7 or higher.

<Applications>

The surface protection sheet disclosed herein provides great efficiency of removal from adherend. Thus, it is preferably used as a surface protection sheet that is applied to surfaces of a metal plate, a coated steel plate, a synthetic resin plate, and the like so as to prevent damage (scratches, contamination, etc.) to these surfaces while they are processed, stored or carried. For instance, it can be preferably used for a purpose of protecting metal plates formed from metals such as stainless steel, aluminum, and iron. Even if applied to an adherend that undergoes significant deformation such as a metal plate subjected to drawing (raising), the surface protection sheet disclosed herein is less susceptible to the occurrence of damage by the process. Thus, for instance, during processing such as drawing of a metal plate, it is favorable as a metal plate protection sheet to protect the surface of the metal plate. The metal plate subjected to such a drawing process may be used, after molded, as components of a dishwasher and various other home appliances, kitchen sinks and bathtubs, name plates, wheel covers, lamps, and kitchen appliances (gas stovetops, etc.). Because the increase in peel strength with aging is inhibited, the surface protection sheet disclosed herein can provide good efficiency of removal even when, for instance, the protection period for the adherend becomes relatively long (typically two weeks or longer, e.g. four weeks or longer). Thus, for instance, it can be favorably used in an embodiment of use where the period after application to adherend (e.g. a metal plate) through adherend processing can be two weeks or more (e.g. four weeks or more).

Matters disclosed by this description include the following:

(1) A surface protection sheet comprising a substrate and a PSA layer placed on one face of the substrate, the surface protection sheet having MD elongation at break $Eb_{MD}$ and TD elongation at break $Eb_{TD}$ of 200% or greater (preferably 500% or greater), and the PSA layer comprises a base polymer having a Tg of −50° C. or higher.

(2) The surface protection sheet according to (1) above having MD tensile strength at break $TS_{MD}$ and TD tensile strength at break $TS_{TD}$ of 15 N/20 mm or greater.

(3) The surface protection sheet according to (1) or (2) above, wherein the PSA layer has toluene-soluble fractions having a weight average molecular weight $S_{Mw}$ of $10 \times 10^4$ or higher.

(4) The surface protection sheet according to any one of (1) to (3) above, wherein the PSA layer has toluene-insoluble fractions having a weight fraction $G_C$ of 60% or higher.

(5) The surface protection sheet according to any one of (1) to (4) above, showing an unloading curve that has a minimum load $L_{min}$ of less than −2.0 μN in nanoindentation.

(6) The surface protection sheet according to any one of (1) to (5) above, wherein the base polymer has a Tg of −40° C. or higher and −10° C. or lower (preferably −30° C. or higher and −15° C. or lower).

(7) The surface protection sheet according to any one of (1) to (6) above, wherein the base polymer is a polymer of a starting monomer mixture that comprises a monomer whose homopolymer has a Tg of 10° C. or higher (i.e. a monomer H) in an amount of 10% by weight or more (preferably 20% by weight or more, more preferably 30% by weight or more, e.g. 35% by weight or more) of the total monomer content.

(8) The surface protection sheet according to any one of (1) to (7) above, wherein the base polymer is a polymer of a starting monomer mixture that comprises a monomer whose homopolymer has a Tg of 60° C. or higher in an amount of 10% by weight or more (preferably 30% by weight or higher, more preferably 30% by weight or higher, e.g. 35% by weight or higher) of the total monomer content.

(9) The surface protection sheet according to any one of (1) to (8) above, wherein the base polymer comprises an acrylic polymer.

(10) The surface protection sheet according to any one of (1) to (9) above, wherein the base polymer is a polymer of a starting monomer mixture that comprises an alkyl (meth) acrylate whose homopolymer has a Tg of 10° C. or higher in an amount of 10% by weight or more (preferably 20% by weight or more, more preferably 30% by weight or more, e.g. 35% by weight or more) of the total monomer content.

(11) The surface protection sheet according to any one of (1) to (10) above, wherein the base polymer is a polymer of a starting monomer mixture that comprises methyl methacrylate in an amount of 10% by weight or more (preferably 20% by weight or more, more preferably 30% by weight or more, e.g. 35% by weight or more) of the total monomer content.

(12) The surface protection sheet according to any one of (1) to (11) above, wherein the PSA layer is formed from an emulsion PSA composition.

(13) The surface protection sheet according to (12) above, wherein the emulsion PSA composition comprises an acrylic polymer synthesized using a reactive surfactant.

(14) The surface protection sheet according to any one of (1) to (13) above, wherein the PSA layer comprises a release-adjusting agent.

(15) The surface protection sheet according to (14) above, wherein the release-adjusting agent is a phosphoric acid ester-based surfactant.

(16) The surface protection sheet according to any one of (1) to (15) above, wherein the substrate has a thickness of 100 μm or less.

(17) The surface protection sheet according to any one of (1) to (16) above, wherein the substrate comprises polyolefinic resin film.

(18) The surface protection sheet according to any one of (1) to (17), wherein the substrate comprises at least either LLDPE film or LDPE film.

(19) The surface protection sheet according to any one of (1) to (18) above, having an aged peel strength $P_A$ of 0.70 N/20 mm or less determined at a peeling rate of 3 m/min after applied to a stainless steel plate and stored at 60° C. for seven days.

(20) The surface protection sheet according to (19) above, wherein the aged peel strength $P_A$ (N/20 mm) is up to two times the initial peel strength $P_0$ (N/20 mm) determined at a peeling rate of 3 m/min at 15 minutes after the surface protection sheet is applied to a stainless steel plate.

(21) A surface protection sheet comprising a substrate and a PSA layer placed on one face of the substrate, wherein the PSA layer has toluene-insoluble fractions having a weight fraction $G_C$ of 60% or higher and toluene-soluble fractions having a weight average molecular weight $S_{Mw}$ of $10 \times 10^4$ or higher, the PSA layer is an acrylic PSA layer comprising an acrylic polymer as its base polymer, the acrylic polymer is a polymer of a starting monomer mixture that comprises methyl methacrylate in an amount of 20% by weight or more of the total monomer content, with the acrylic polymer having a Tg of −40° C. or higher and −10° C. or lower, the substrate is LLDPE film or LDPE film, the substrate having a thickness of 40 μm or larger and 100 μm or smaller, the surface protection sheet has MD elongation at break $Eb_{MD}$ and TD elongation at break $Eb_{TD}$ of 500% or higher.

(22) The surface protection sheet according to any one of (1) to (21) above used on a metal plate subjected to drawing.

EXAMPLES

Several working examples related to the present invention are described below, but the present invention should not be limited to these examples. In the description below, "part(s)" and "%" are by weight unless otherwise specified.

Example 1

(Synthesis of Acrylic Polymer A1P)

Were mixed 57 parts of 2-ethylhexyl acrylate (2EHA), 41 parts of methyl methacrylate (MMA), 2 parts of acrylic acid (AA), 3 parts of emulsifier (based on non-volatiles), and 42 parts of ion-exchanged water. The resulting mixture was stirred with a homomixer to prepare an aqueous emulsion (monomer emulsion). As the emulsifier, was used a reactive anionic emulsifier (trade name AQUALON KH-1025 available from Dai-ichi Kogyo Seiyaku Co., Ltd.).

Into a reaction vessel equipped with a condenser, a nitrogen inlet, a thermometer and a stirrer, was placed 51.5 parts of ion-exchanged water; the resultant was stirred at room temperature for at least one hour while introducing nitrogen gas. Subsequently, the system was heated to 70° C.; 0.05 part of ammonium persulfate (APS) was added; and while stirring, the monomer emulsion was gradually added over three hours. After the completion of the addition of the monomer emulsion, the reaction mixture was continuously stirred at 75° C. for two hours and then cooled to 30° C. To the resulting polymerization reaction mixture, 10% ammonia water was added to adjust the pH to 8. An aqueous dispersion of acrylic polymer A1P (50% acrylic polymer A1P concentration) was thus obtained.

(Preparation of PSA Composition A1C)

To 100 parts of the acrylic polymer A1P in the aqueous dispersion obtained above, was added 2 parts of a crosslinking agent. The resulting mixture was stirred at 23° C. at 300 rpm for 10 minutes to prepare a PSA composition A1C. As the crosslinking agent, was used a water-soluble crosslinking agent (trade name EPOCROS WS-500 available from Nippon Shokubai Co., Ltd.; oxazoline equivalence: 220 g·solid/eq).

(Fabrication of Surface Protection Sheet)

Were obtained two sheets of 50 μm thick LLDPE resin film F1 having one corona-treated face. To the corona-treated face of the first sheet of resin film F1, the acrylic PSA composition A1C was applied and allowed to dry at 90° C. for one minute to form a 5 μm thick PSA layer, whereby a surface protection sheet was obtained with an overall thickness of 55 μm. With respect to the second sheet of resin film F1, its non-corona-treated face (second face) was adhered to the PSA layer and used as a release liner.

Example 2

The emulsifier was used in an amount of 2 parts in the preparation of the monomer emulsion. The monomer emulsion was added over two hours and one part of a phosphoric acid ester-based surfactant (polyoxyethylene tridecyl ether phosphate under trade name RHODAFAC RS710-E available from Solvay) was used in the polymerization as a release-adjusting agent to 100 parts of the starting monomer mixture. Otherwise in the same manner as the synthesis of the acrylic polymer A1P, an aqueous dispersion of acrylic polymer A2P was obtained. Using this aqueous dispersion, but otherwise in the same manner as the preparation of the PSA composition A1C, was prepared a PSA composition A2C.

Were obtained two sheets of 50 μm thick LLDPE resin film F2 having one corona-treated face. Using the PSA composition A2C and the resin film F2 in place of the PSA composition A1C and the resin film F1, but otherwise in the same manner as in Example 1, a surface protection sheet according to the present example was obtained.

Example 3

The amounts of 2EHA and MMA were changed to 61 parts and 37 parts, respectively. Otherwise in the same manner as the synthesis of acrylic polymer A2P, an aqueous dispersion of acrylic polymer A3P was obtained. Using this aqueous dispersion, but otherwise in the same manner as the preparation of the PSA composition A1C, was prepared a PSA composition A3C.

Were obtained two sheets of 50 μm thick LLDPE resin film F3 having one corona-treated face. Using the PSA composition A3C and the resin film F3 in place of the PSA composition A1C and the resin film F1, but otherwise in the same manner as in Example 1, a surface protection sheet according to the present example was obtained.

Comparative Example 1

Were mixed 65 parts of ethyl acrylate (EA), 20 parts of 2EHA, 10 parts of MMA, 5 parts of acrylonitrile (AN), 3 parts of emulsifier (based on non-volatiles) and 42 parts of ion-exchanged water. The resulting mixture was stirred with a homomixer to prepare an aqueous emulsion (monomer emulsion). As the emulsifier, was used a reactive anionic emulsifier (trade name AQUALON KH-1025 available from Dai-ichi Kogyo Seiyaku Co., Ltd.). The monomer emulsion was added over five hours. Otherwise in the same manner as the synthesis of the acrylic polymer A1P, was obtained an aqueous dispersion of acrylic polymer A4P. Using this aqueous dispersion, but otherwise in the same manner as the preparation of the PSA composition A1C, was prepared a PSA composition A4C.

Were obtained two sheets of 50 µm thick LDPE resin film F4 having one corona-treated face. Using the PSA composition A4C and the resin film F4 in place of the PSA composition A1C and the resin film F1, but otherwise in the same manner as in Example 1, a surface protection sheet according to the present example was obtained.

<Measurements and Evaluations (1)>

With respect to Examples 1 to 3 and Comparative Example 1, according to the methods described earlier, their gel fractions $G_C$, sol molecular weights $S_{Mw}$, elongation at break, tensile strength at break, and minimum loads $L_{min}$ of their unloading curves were determined. In addition, the following peel strength measurement and drawing test were carried out. The results are shown in Table 2 with a summary of the features of the surface protection sheet according to each Example.

(Initial Mid-Rate Peel Strength $P_0$)

The surface protection sheet to be measured was cut to a 20 mm wide by 100 mm long strip to prepare a test piece. In a standard environment at 23° C., 50% RH, with a 2 kg rubber roller moved back and forth twice, the test piece was press-bonded to a stainless steel plate (SUS430BA plate) as the adherend. The sample was stored in the standard environment for 15 minutes. In the same standard environment, using a universal tensile tester, the initial mid-rate peel strength $P_0$ (N/20 mm) was determined at a tensile speed of 3 m/min, at 180° peel angle.

(Aged Mid-Rate Peel Strength $P_A$)

The surface protection sheet to be measured was cut to a 20 mm wide by 100 mm long strip to prepare a test piece. In a standard environment at 23° C., 50% RH, with a 2 kg rubber roller moved back and forth twice, the test piece was press-bonded to a stainless steel plate (SUS430BA plate) as the adherend. The sample was stored in an environment at 60° C. for seven days and then in a standard environment at 23° C., 50% RH for one hour. Subsequently, in the same standard environment, using a universal tensile tester, the aged mid-rate peel strength $P_A$ (N/20 mm) was determined at a tensile speed of 3 m/min, at 180° peel angle.

(Aged Low-Rate Peel Strength $P_B$)

The tensile speed was set to 0.3 m/min, but otherwise in the same manner as the measurement of aged mid-rate peel strength $P_A$, the aged low-rate peel strength $P_B$ was determined.

(Drawing Test)

Was obtained a 0.6 mm thick, 93 mm diameter round BA-finish stainless steel plate (SUS304BA plate). To the stainless steel plate, the surface protection sheet according to each Example in a size slightly larger than the stainless steel plate was press-bonded with a 2 kg rubber roller moved back and forth twice. This was stored in an environment at 60° C. for 24 hours and then the margin of the surface protection sheet hanging outside the rim of the stainless steel plate was cut off along the rim to prepare a measurement sample. The measurement sample was subjected to drawing to form a cup of 45 mm diameter and 20 mm depth at the center of the sample (cup test). With respect to the drawn measurement sample, the total length of broken portions in the outer circumference of the surface protection sheet was determined. The measurement was carried out three times (n=3) and the anti-breakage property was evaluated by the grades shown below.

E: No breakage was observed in the surface protection sheet, or some broken strips of the surface protection sheet were observed along the outer circumference of the measurement sample, but the total length of broken portions over the entire outer circumference was less than 5 mm (excellent anti-breakage property).

G: Some broken strips of the surface protection sheet were observed along the outer circumference of the measurement sample, but the total length of broken portions over the entire outer circumference was 5 mm or greater and 10 mm or less (practically sufficient, good anti-breakage property).

P: Broken strips of the surface protection sheet were observed along the outer circumference of the measurement sample, and the total length of broken portions over the entire outer circumference was greater than 10 mm (poor anti-breakage property).

TABLE 2

|  |  |  | Ex. 1 | Ex. 2 | Ex. 3 | Comp. Ex. 1 |
|---|---|---|---|---|---|---|
| PSA |  | Species | A1C | A2C | A3C | A4C |
|  |  | Thickness | 5 µm | 5 µm | 5 µm | 5 µm |
|  | Base polymer | Species | A1P | A2P | A3P | A4P |
|  |  | Emulsifer (parts by wt) | 3 | 2 | 2 | 3 |
|  |  | Time for addition (h) | 3 | 2 | 2 | 5 |
|  |  | Tg | −20° C. | −20° C. | −25° C. | 20° C. |
|  |  | Monomer composition | 2EHA/MMA/AA | 2EHA/MMA/AA | 2EHA/MMA/AA | EA/2EHA/MMA/AN |
|  |  | Weight ratio | 57/41/2 | 57/41/2 | 61/37/2 | 65/20/10/5 |
|  | Monomers with Tg ≥10° C. |  | 43% | 43% | 39% | 15% |
|  | Crosslinking agent (parts by wt) |  | 2 | 2 | 2 | 2 |
|  | Release-adjusting agent (parts by wt) |  | — | 1 | 1 | — |
|  | Gel fraction $G_C$ |  | 87% | 79% | 81% | 85% |
|  | Sol molecular weight $S_{Mw}$ |  | $47 \times 10^4$ | $54 \times 10^4$ | $64 \times 10^4$ | $5 \times 10^4$ |

TABLE 2-continued

|  |  |  | Ex. 1 | Ex. 2 | Ex. 3 | Comp. Ex. 1 |
|---|---|---|---|---|---|---|
| Substrate |  | Species (material) | F1 (LLDPE) | F2 (LLDPE) | F3 (LLDPE) | F4 (LDPE) |
|  |  | Thickness | 50 μm | 50 μm | 50 μm | 50 μm |
| Surface protection sheet | Elongation at break | MD | 742% | 641% | 668% | 163% |
|  |  | TD | 786% | 920% | 1071% | 69% |
|  | Tensile strength at break (N/20 mm) | MD | 26 | 25 | 26 | 29 |
|  |  | TD | 20 | 24 | 29 | 15 |
| Peel strength | 3 m/min (N/20 mm) | Initial $P_0$ | 0.21 | 0.18 | 0.26 | 0.35 |
|  |  | Aged $P_A$ | 0.20 | 0.25 | 0.45 | 0.80 |
|  |  | $P_A/P_0$ | 0.95 | 1.39 | 1.73 | 2.29 |
|  | 0.3 m/min (N/20 mm), aged $P_B$ |  | 0.45 | 0.18 | 0.76 | 1.61 |
| Minimum load $L_{min}$ of unloading curve |  |  | −5.28 μN | −5.37 μN | −2.82 μN | −1.97 μN |
| Drawing test |  |  | E | E | E | P |

As evident from Table 2, with respect to the surface protection sheets of Examples 1 to 3 with base polymer Tg at or above −50° C. and with $Eb_{MD}$ and $Eb_{TD}$ each at or above 200%, good anti-breakage properties were exhibited in the drawing test. On the other hand, the surface protection sheet of Comparative Example 1 with $Eb_{MD}$ and $Eb_{TD}$ below 200%, the anti-breakage property was clearly inferior to Examples 1 to 3. The surface protection sheets of Examples 1 to 3 also exhibited favorable light peelability even after aged.

Examples 4 to 6

The amount of the crosslinking agent was changed to 4 parts to 100 parts of the acrylic polymer. Otherwise in the same manner as the preparation of the PSA compositions A1C, A2C and A3C, were prepared PSA compositions A5C, A6C and A7C, respectively. Using these PSA compositions A5C, A6C and A7C, but otherwise in the same manner as in Examples 1 to 3, were obtained surface protection sheets according to Examples 4 to 6.

Example 7

The amounts of 2EHA and MMA were changed to 54 parts and 44 parts, respectively. The monomer emulsion was added over four hours. Otherwise in the same manner as the synthesis of the acrylic polymer A1P, was obtained an aqueous dispersion of acrylic polymer A5P. Using this aqueous dispersion and 1 part of the crosslinking agent to 100 parts of the acrylic polymer, but otherwise in the same manner as the preparation of the PSA composition A1C, was prepared a PSA composition A8C.

Were obtained two sheets of 50 μm thick LDPE resin film F5 having one corona-treated face. Using the PSA composition A8C and the resin film F5 in place of the PSA composition A1C and the resin film F1, but otherwise in the same manner as in Example 1, was obtained a surface protection sheet according to the present example.

Example 8

The amount of the crosslinking agent was changed to 2 parts to 100 parts of the acrylic polymer. Otherwise in the same manner as the preparation of the PSA compositions A8C, was prepared a PSA composition A9C. Using the PSA compositions A9C, but otherwise in the same manner as in Example 7, was obtained a surface protection sheet according to the present example.

Example 9

The composition of the starting monomer mixture was changed to 66 parts n-butyl acrylate (BA), 32 parts isobornyl acrylate (IBXA) and 2 parts AA. Otherwise in the same manner as for the synthesis of the acrylic polymer A2P, was obtained an aqueous dispersion of acrylic polymer A6P. Using this aqueous dispersion, but otherwise in the same manner as the preparation of the PSA composition A2C, was prepared a PSA composition A10C.

Were obtained two sheets of 50 μm thick LLDPE resin film F6 having one corona-treated face. Using the PSA composition A10C and the resin film F6 in place of the PSA composition A1C and the resin film F1, but otherwise in the same manner as in Example 1, a surface protection sheet according to the present example was obtained.

Example 10

The amount of the crosslinking agent was changed to 4 parts to 100 parts of the acrylic polymer. Otherwise in the same manner as the preparation of the PSA compositions A10C, was prepared a PSA composition A11C. Using the PSA compositions A11C, but otherwise in the same manner as in Example 9, was obtained a surface protection sheet according to the present example.

<Measurements and Evaluations (2)>

With respect to Examples 4 to 10, the same measurements and evaluations were carried out as in Examples 1 to 3 and Comparative Example 1. The results are shown in Table 3 with a summary of the features of the surface protection sheet according to each Example.

TABLE 3

|  |  |  | Ex. 4 | Ex. 5 | Ex. 6 | Ex. 7 |
|---|---|---|---|---|---|---|
| PSA |  | Species | A5C | A6C | A7C | A8C |
|  |  | Thickness | 5 μm | 5 μm | 5 μm | 5 μm |
|  | Base polymer | Species | A1P | A2P | A3P | A5P |
|  |  | Emulsifer (parts by wt) | 3 | 2 | 2 | 2 |
|  |  | Time for addition (h) | 3 | 2 | 2 | 4 |
|  |  | Tg | −20° C. | −20° C. | −25° C. | −15° C. |

TABLE 3-continued

|  |  |  | | | | |
|---|---|---|---|---|---|---|
|  |  | Monomer composition | 2EHA/MMA/AA | 2EHA/MMA/AA | 2EHA/MMA/AA | 2EHA/MMA/AA |
|  |  | Weight ratio | 57/41/2 | 57/41/2 | 61/37/2 | 54/44/2 |
|  |  | Monomers with Tg ≥10° C. | 43% | 43% | 39% | 46% |
|  |  | Crosslinking agent (parts by wt) | 4 | 4 | 4 | 1 |
|  |  | Release-adjusting agent (parts by wt) | — | 1 | 1 | — |
|  |  | Gel fraction $G_C$ | 93% | 90% | 91% | 65% |
|  |  | Sol molecular weight $S_{Mw}$ | 22 × 10⁴ | 25 × 10⁴ | 35 × 10⁴ | 38 × 10⁴ |
| Substrate |  | Species (material) | F1 (LLDPE) | F2 (LLDPE) | F3 (LLDPE) | F5 (LDPE) |
|  |  | Thickness | 50 μm | 50 μm | 50 μm | 50 μm |
| Surface protection sheet | Elongation at break | MD | 738% | 661% | 643% | 362% |
|  |  | TD | 772% | 956% | 984% | 506% |
|  | Tensile strength at break (N/20 mm) | MD | 27 | 26 | 27 | 27 |
|  |  | TD | 20 | 25 | 26 | 16 |
| Peel strength | 3 m/min (N/20 mm) | Initial $P_0$ | 0.18 | 0.15 | 0.21 | 0.19 |
|  |  | Aged $P_A$ | 0.19 | 0.15 | 0.39 | 0.28 |
|  |  | $P_A/P_0$ | 1.06 | 1.00 | 1.86 | 1.47 |
|  | 0.3 m/min (N/20 mm), aged $P_B$ |  | 0.25 | 0.16 | 0.63 | 0.33 |
|  | Minimum load $L_{min}$ of unloading curve |  | −5.78 μN | −6.77 μN | −4.32 μN | −5.86 μN |
|  | Drawing test |  | E | E | E | G |

|  |  |  | Ex. 8 | Ex. 9 | Ex. 10 |
|---|---|---|---|---|---|
| PSA |  | Species | A9C | A10C | A11C |
|  |  | Thickness | 5 μm | 5 μm | 5 μm |
|  | Base polymer | Species | A5P | A6P | A6P |
|  |  | Emulsifer (parts by wt) | 2 | 2 | 2 |
|  |  | Time for addition (h) | 4 | 2 | 2 |
|  |  | Tg | −15° C. | −20° C. | −20° C. |
|  |  | Monomer composition | 2EHA/MMA/AA | BA/IBXA/AA | BA/IBXA/AA |
|  |  | Weight ratio | 54/44/2 | 66/32/2 | 66/32/2 |
|  |  | Monomers with Tg ≥10° C. | 46% | 34% | 34% |
|  |  | Crosslinking agent (parts by wt) | 2 | 2 | 4 |
|  |  | Release-adjusting agent (parts by wt) | — | 1 | 1 |
|  |  | Gel fraction $G_C$ | 76% | 81% | 92% |
|  |  | Sol molecular weight $S_{Mw}$ | 29 × 10⁴ | 57 × 10⁴ | 30 × 10⁴ |
| Substrate |  | Species (material) | F5 (LDPE) | F6 (LLDPE) | F6 (LLDPE) |
|  |  | Thickness | 50 μm | 50 μm | 50 μm |
| Surface protection sheet | Elongation at break | MD | 387% | 580% | 593% |
|  |  | TD | 495% | 734% | 765% |
|  | Tensile strength at break (N/20 mm) | MD | 28 | 23 | 25 |
|  |  | TD | 19 | 24 | 24 |
| Peel strength | 3 m/min (N/20 mm) | Initial $P_0$ | 0.15 | 0.41 | 0.33 |
|  |  | Aged $P_A$ | 0.18 | 0.66 | 0.58 |
|  |  | $P_A/P_0$ | 1.20 | 1.61 | 1.76 |
|  | 0.3 m/min (N/20 mm), aged $P_B$ |  | 0.21 | 0.68 | 0.51 |
|  | Minimum load $L_{min}$ of unloading curve |  | −6.23 μN | −6.78 μN | −7.32 μN |
|  | Drawing test |  | G | E | E |

As evident from Table 3, with respect to the surface protection sheets of Examples 4 to 10 with base polymer Tg at or above −50° C. and with $Eb_{MD}$ and $Eb_{TD}$ each at or above 200%, good anti-breakage properties were shown in the drawing test. Especially great results were obtained in Examples 4 to 6, 9 and 10 with $Eb_{MD}$ and $Eb_{TD}$ each at or above 500%. The surface protection sheets of Examples 4 to 10 also exhibited great ease of release even after aged.

Although specific embodiments of the present invention have been described in detail above, these are merely for illustrations and do not limit the scope of the claims. The art according to the claims includes various modifications and changes made to the specific embodiments illustrated above.

REFERENCE SIGNS LIST

1: support substrate
1A: first face
1B: second face
2: PSA layer
2A: adhesive face
10: surface protection sheet

What is claimed is:

1. A surface protection sheet comprising a substrate and a pressure-sensitive adhesive layer placed on one face of the substrate, wherein:
the surface protection sheet has 200% or greater elongation at break in its machine direction as well as 200% or greater elongation at break in its transverse direction, and
the pressure-sensitive adhesive layer is directly formed from an emulsion pressure sensitive adhesive composition,
wherein the emulsion pressure sensitive adhesive composition comprises 100 parts by weight of an acrylic polymer as a base polymer having a glass transition temperature of −50° C. or higher, and 0.01 parts by weight or greater and 10 parts by weight or less of a crosslinking agent,
the acrylic polymer is formed from a monomer mixture, wherein, in the monomer mixture, (a) a content of an acrylic monomer is 50% by weight or more based on a total monomer content, (b) a content of a monomer whose homopolymer has a glass transition temperature of 60° C. or higher is 35% by weight or more based on the total monomer content, and (c) a content of a carboxyl group-containing monomer is 0.5% by weight or higher and 20% by weight or lower based on the total monomer content, the pressure-sensitive adhesive layer has toluene-insoluble fractions having a gel fraction $G_C$ of 75% or higher, the pressure-sensitive adhesive layer has toluene-soluble fractions having a weight average molecular weight $S_{Mw}$ of $20 \times 10^4$ or higher and $100 \times 10^4$ or lower, and the pressure-sensitive adhesive layer shows, in nanoindentation, an unloading curve having a minimum load $L_{min}$ of less than $-2.0$ µN.

2. The surface protection sheet according to claim 1, wherein the base polymer has a glass transition temperature of $-40°$ C. or higher and $-10°$ C. or lower.

3. The surface protection sheet according to claim 1, wherein the pressure-sensitive adhesive layer is an acrylic pressure-sensitive adhesive layer.

4. The surface protection sheet according to claim 1, wherein the substrate has a thickness of 100 µm or less.

5. The surface protection sheet according to claim 1, wherein the substrate comprises a polyolefinic resin film formed from a polyethylene resin comprising at least one of a low density polyethylene and a linear low density polyethylene.

6. The surface protection sheet according to claim 1 having an aged peel strength $P_A$ of 0.70 N/20 mm or less, determined at a peeling rate of 3 m/min after the surface protection sheet is applied to a stainless steel plate and stored at 60° C. for seven days.

7. The surface protection sheet according to claim 6 having an initial peel strength $P_0$ (in N/20 mm), determined at a peeling rate of 3 m/min at 15 minutes after the surface protection sheet is applied to a stainless steel plate, wherein the aged peel strength $P_A$ (in N/20 mm) is up to 2.0 times the initial peel strength $P_0$.

8. The surface protection sheet according to claim 1 for use on a metal plate to be drawn.

9. The surface protection sheet according to claim 1, wherein the acrylic polymer is synthesized using a reactive surfactant.

10. A surface protection sheet comprising a substrate and a pressure-sensitive adhesive layer placed on one face of the substrate, wherein the surface protection sheet has 500% or greater elongation at break in its machine direction as well as 500% or greater elongation at break in its transverse direction, the pressure-sensitive adhesive layer is directly formed from an emulsion pressure-sensitive adhesive composition, the substrate is a linear low density polyethylene film or a low density polyethylene film and has a thickness of 40 µm or larger and 100 µm or smaller, the emulsion pressure-sensitive adhesive composition comprises 100 parts by weight of an acrylic polymer as a base polymer having a glass transition temperature of $-40°$ C. or higher and $-10°$ C. or lower, and 0.01 part by weight or greater and 10 parts by weight or less of a crosslinking agent, the acrylic polymer is a polymer formed from a monomer mixture, wherein, in the monomer mixture, (a) a content of an acrylic monomer is 50% by weight or more based on the total monomer content, (b) a content of a methyl methacrylate is 35% by weight or more based on the total monomer content, and (c) a content of a carboxyl group-containing monomer is 0.5% by weight or higher and 20% by weight or lower based on the total monomer content, the pressure-sensitive adhesive layer has toluene-insoluble fractions having a gel fraction $G_C$ of 75% or higher and toluene-soluble fractions having a weight average molecular weight $S_{Mw}$ of $20 \times 10^4$ or higher and $100 \times 10^4$ or lower, and the pressure-sensitive adhesive layer shows, in nanoindentation, an unloading curve having a minimum load $L_{min}$ of less than $-2.0$ µN.

11. A surface protection sheet comprising a substrate and a pressure-sensitive adhesive layer placed on one face of the substrate, wherein:

the surface protection sheet has 200% or greater elongation at break in its machine direction as well as 200% or greater elongation at break in its transverse direction, the pressure-sensitive adhesive layer is directly formed from an emulsion pressure-sensitive adhesive composition, the emulsion pressure-sensitive adhesive composition comprises 100 parts by weight of an acrylic polymer as a base polymer having a glass transition temperature of $-50°$ C. or higher, and 0.01 parts by weight or greater and 10 parts by weight or less of a crosslinking agent, and the acrylic polymer is formed from a monomer mixture, wherein, in the monomer mixture, (a) a content of an acrylic monomer is 50% by weight or more based on the total monomer content, (b) a content of a monomer whose homopolymer has a glass transition temperature of 60° C. or higher is 35% by weight or more based on the total monomer content, (c) a content of a carboxyl group-containing monomer is 0.5% by weight or higher and 20% by weight or lower based on the total monomer content, and the monomer whose homopolymer has a glass transition temperature of 60° C. or higher includes 70% by weight cycloalkyl (meth)acrylate, the pressure-sensitive adhesive layer has toluene-insoluble fractions having a gel fraction $G_C$ of 75% or higher, the pressure-sensitive adhesive layer has toluene-soluble fractions having a weight average molecular weight $S_{Mw}$ of $20 \times 10^4$ or higher and $100 \times 10^4$ or lower, and the pressure-sensitive adhesive layer shows, in nanoindentation, an unloading curve having a minimum load $L_{min}$ of less than $-2.0$ µN.

12. A surface protective film according to claim 11, wherein a content of the carboxyl group containing monomer is 0.5% by weight or higher and 5% by weight or lower, based on the total monomer content.

* * * * *